(12) United States Patent
Lam et al.

(10) Patent No.: US 7,890,689 B2
(45) Date of Patent: *Feb. 15, 2011

(54) VIRTUAL APPLIANCE MANAGEMENT

(75) Inventors: Monica Sin-Ling Lam, Menlo Park, CA (US); Constantine Paul Sapuntzakis, Mountain View, CA (US); Ramesh U. V. Chandra, Belmont, CA (US); Nickolai Borisovich Zeldovich, Redwood City, CA (US); Mendel Rosenblum, Stanford, CA (US); James Eugene Chow, San Mateo, CA (US); David James Brumley, Pittsburgh, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/043,672

(22) Filed: Mar. 6, 2008

(65) Prior Publication Data

US 2008/0215796 A1    Sep. 4, 2008

Related U.S. Application Data

(63) Continuation of application No. 11/007,911, filed on Dec. 8, 2004, now Pat. No. 7,373,451.

(60) Provisional application No. 60/528,220, filed on Dec. 8, 2003.

(51) Int. Cl.
G06F 12/00    (2006.01)

(52) U.S. Cl. .................. 711/6; 711/118; 718/1

(58) Field of Classification Search .............. 711/6, 711/118; 718/1
See application file for complete search history.

(56) References Cited

U.S. PATENT DOCUMENTS

| 6,356,941 | B1 | 3/2002 | Cohen | 709/219 |
|---|---|---|---|---|
| 6,363,411 | B1 | 3/2002 | Dugan et al. | 709/202 |
| 6,397,242 | B1 | 5/2002 | Devine et al. | 718/1 |
| 6,496,847 | B1 | 12/2002 | Bugnion | 718/1 |

(Continued)

OTHER PUBLICATIONS

"In-Virtual Information Grid Organizations," About In-VIGO Project—ACIS—UFL, In-VIGO, last modified Jul. 31, 2004, pp. 1-4 [Retrieved from the Internet Oct. 25, 2004] [Retrieved from <<URL: http://invigo.acis.ufl.edu/docs/aboutInVigoFAQ.html].

(Continued)

*Primary Examiner*—Hashem Farrokh
(74) *Attorney, Agent, or Firm*—Crawford Maunu PLLC

(57) ABSTRACT

Various approaches for virtual appliance management are described. In one approach a virtual appliance repository stores one or more virtual appliances and is coupled to the host computer via a network. A storage device stores a transceiver program capable when executed on said host computer of requesting and receiving the virtual appliances, and generating for each received virtual appliance a respective local copy on the host computer of each received virtual appliance. The local copy is private to the host computer. The transceiver program further binds the virtual appliances to the host computer and obtains user data relevant to the virtual appliances. The transceiver program runs each of the virtual appliances from the respective private local copies on the host computer.

17 Claims, 9 Drawing Sheets

U.S. PATENT DOCUMENTS

| | | | |
|---|---|---|---|
| 6,704,925 B1 | 3/2004 | Bugnion | 717/138 |
| 6,711,672 B1 | 3/2004 | Agesen | 712/227 |
| 6,725,289 B1 | 4/2004 | Waldspurger et al. | 710/9 |
| 6,735,601 B1 * | 5/2004 | Subrahmanyam | 1/1 |
| 6,785,886 B1 | 8/2004 | Lim et al. | 718/1 |
| 6,789,156 B1 | 9/2004 | Waldspurger | 711/6 |
| 6,795,966 B1 | 9/2004 | Lim et al. | 718/1 |
| 7,373,451 B2 | 5/2008 | Lam et al. | 711/6 |
| 7,428,636 B1 * | 9/2008 | Waldspurger et al. | 713/164 |
| 7,577,722 B1 * | 8/2009 | Khandekar et al. | 709/220 |

OTHER PUBLICATIONS

"In-Vigo Frequently Asked Questions," In-VIGO Frequently Asked Questions (FAQ), In-VIGO, last modified Oct. 10, 2003, pp. 1-3 pages [Retrieved from the Internet Oct. 25, 2004] [Retrieved from <<URL: http://invigo.acis.ufl.edu/docs/InVigoFAQ.html>>].

"New Versions of PageBox: simple to use with examples" PageBox, pp. 1-4 {Retrieved from the Internet Oct. 25, 2004 [Retrieved from URL: http: //www.pagebox.net/newPB.html#toc5>>].

"Pluggable PageBox device hosting Java, PHP or ASP.NET PageBox" PageBox, pp. 1-2 [Retrieved from the Internet Oct. 25, 2004] [Retrieved from URL: http: //www.pagebox.net/device.html>>].

"Knoppix Information" KNOPPIX-Live LinusFilesystem on CD, Knopper.Net, pp. 1-4 [Retrieved from the Internet Oct. 25, 2004] [Retrieved from URL:http: //www.knoppix.org/>>].

Stephen Swoyer, "Special Report: Remote Access—on Windows NT—Technology Information" pp. 1-4 [Retrieved from the Internet Oct. 25, 2004] [Retrieved from URL: http: //www.findarticles.com/p/articles/mi_m0FOX/is_4_4/ai_54299245>>].

"Rational Robot" IBM, p. 1 [Retrieved from the Internet Oct. 25, 2004] [Retrieved from <<URL: http: www-306.ibm.com/software/awdtools/tester/robot/>>].

VMware GSX Server, Product Datasheet, pp. 1-2 [Retrieved from the Internet Oct. 25, 2004] [Retrieved from <<URL: http: www.vmware.com/products/server/gsx_features.html>>].

Xnee Description, pp. 1-2 [Retrieved from the Internet Oct. 25, 2004] [Retrieved from <<URL: http: www.gnu.org/software/xnee/www/>>].

J.J. Kistler and M. Satyanarayanan "Disconnected Operation in the Coda File System," *Proceedings*, Thirteenth ACM Symposium on Operating Systems Principles, pp. 213-225, 1991.

M. Kozuch and M. Satyanarayanan "Internet Suspend/Resume." *Proceedings*, Workshop on Mobile Computing Systems and Applications, pp. 40-46, Jun. 2002.

V.K. Naik, A. Mohindra, and D.F. Bantz "An Architecture for the Coordination of System Management Services," IBM Systems Journal, 43 (1): 78-96, Jan. 2004.

T. Richardson, Q. Stafford-Fraser, K.R. Wood, and A. Hopper, "Virtual Network Computing," IEEE Internet Computing, 2(1): 33-38, Jan./Feb. 1998.

L. Rizzo "Dummynet: a simple approach to the evaluation of network protocols," ACM Computer Communication Review, 27(1): 31-41, 1997.

C. Sapuntzakis, D. Brumley, R. Chandra, N. Zeldovich, J. Chow, J. Norris, M.S. Lam, and M. Rosenblum "Virtual Appliances for Deploying and Maintaining Software," Proceedings, Seventeenth USENIX Large Installation System Administration Conference, pp. 181-194, 2003.

C. Sapuntzakis, R. Chandra, B. Pfaff, J. Chow, M. Lam, and M. Rosenblum "Optimizing the Migration of Virtual Computers," Proceedings, Fifth Symposium on Operating Systems Design and Implementation, pp. 1-14, Dec. 2002.

C. Sapuntzakis and M. Lam "Virtual Appliances in the Collective: A Road to Hassle-Free Computing," Workshop on Hot Topics in Operating Systems, pp. 1-6, 2003.

N. Tolia, J. Harkes, M. Kozuch, and M. Satyanarayanan "Integrating Portable and Distributed Storage," *Proceedings* $4^{th}$ Conference on File and Storage Technologies, pp. 227-238, Apr. 2004.

M. Zhao, J. Zhang, and R. Figueiredo "Distributed File System Support for Virtual Machines in Grid Computing," Proceedings, Thirteenth IEEE Symposium on High-Performance Distributed Computing, pp. 1-10, Jun. 2004.

Peter M. Chen et al., "When Virtual Is Better Than Real," Hot Topics in Operating Systems, pp. 133-138, IEEE Comput. Soc., 2001.

Amr Awadallah et al., "The vMatrix: A Network of Virtual Machine Monitors for Dynamic Content Distribution," in Seventh International Workshop on Web Content Caching and Distribution, Aug. 2002.

Steven Osman et al., "The Design and Implementation of Zap: A System for Migrating Computing Environments," Proceedings of the $5^{th}$ Operating Systems Design and Implementation (OSDI 2002), Boston, MA, Dec. 2002.

* cited by examiner

VIRTUAL APPLIANCE MANAGEMENT

CROSS-REFERENCE TO RELATED PATENT DOCUMENTS

This application is a continuation of U.S. patent application Ser. No. 11/007,911 (STFD.096PA), entitled "A Cache-Based System Management Architecture With Virtual Appliances, Network Repositories, And Virtual Appliance Transceivers" and filed on Dec. 8, 2004, now U.S. Pat. No. 7,373,451 issued May 13, 2008, to which priority is claimed under 35 U.S.C. §120. This application and application Ser. No. 11/007,911 also claim priority under 35 USC §119(e) to U.S. Provisional Patent Application No. 60/528,220, filed on Dec. 8, 2003, and this application incorporates by reference the contents of both application Ser. No. 11/007,911 and provisional application 60/528,220.

FEDERALLY-SPONSORED RESEARCH OR DEVELOPMENT

This invention was made with Government support under contract 0121481 awarded by the National Science Foundation. The Government has certain rights in this invention.

BACKGROUND

1. Field of the Invention

This invention relates generally to computer system management. More particularly, it relates to a cache-based system management architecture useful for automatic software distribution/update, system administration/maintenance such as optimization and backup, data recovery, mobile computing, and so on.

2. Background Description

Today's computers, their software and hardware components, require constant updates and frequent upgrades. System management is complex, costly, and critical to the security and proper functioning of any computer network. Maintaining/managing a computer system, regardless of its size, can be a burden and perhaps a daunting task to many people.

The tasks of system management include hardware deployment, software installation, continuous security patches and software upgrades, system backups, as well as recoveries from virus attacks, hardware failures, and other forms of disasters. Unlike server machines that can be centralized, desktop machine management is necessarily distributed. For example, a user may need to access her computer at work, on the road, and from home. Moreover, employees of a company may be distributed all around the globe, making system management an even more complex problem.

Distributed systems are notorious for being hard to manage. To ensure that systems are up to date, many system administrators and consumers alike rely on patch management, ranging from operating system update to specialized commercial packages. None of the existing products available today can, however, autonomously decide what patches to apply/install on what computer and how the patches interact with software programs already installed on that particular computer. Varieties in computer configurations and many other factors such as protocols and network connections make it very difficult to design a reliable and versatile system management tool with universally applicable policies and constraints. As such, patches can fail to apply correctly or interact poorly with installed software.

To make software management more uniform and reliable, many companies use disk imaging to guarantee that all the desktops have the same configuration. Imaging is time consuming and disruptive, as it requires the machine to be shut down and entire partitions rewritten, limiting how often updates can be propagated.

Some enterprises utilize the remote display technology, e.g., Citrix® and Microsoft® Windows Terminal Server, to give users remote access to centrally managed machines. However, remote display provides much worse interactive performance than local execution and is sensitive to network disruptions.

In many consumer computer products and services, the burden of system management is relieved or minimized with the introduction of fixed function computer appliances such as TV set-top boxes or digital video recorders (DVRs). A drawback is that these simple fixed function computer appliances are not designed and thus cannot tackle the complex system management issues discussed above.

Clearly, there is a continuing need in the art for a better, more reliable system management architecture that is easy to manage, secure, and supportive of mobile computing regardless of discrepancies in computer configurations and computing environments. The present invention addresses this need.

SUMMARY OF THE INVENTION

An object of the present invention is to automate the management of computers (herein referred to interchangeably as machines) in the workplace and homes without adversely affecting system performance and without unduly restricting users' choice to customize. Management of a virtual appliance (VA) is provided by an electronic device. The device includes a portable housing and a computer-readable storage medium disposed in the housing. The storage medium is configured with software that implements a virtual appliance transceiver (VAT) that is accessible and executable by a computer that is external to the housing and removably coupled to the storage medium. The VAT is configured to retrieve in response to user selection of a VA, the VA from a repository having a plurality of VAs. Each VA includes at least a set of application software. Execution of the software of the VA is initiated on the external computer by the VAT.

In other embodiments, this object is achieved in a cache-based system management architecture, which is named "the Collective." The Collective manages systems by manipulating the system state, which includes the operating system and applications. A virtual appliance separates the system state from the user data. A virtual appliance can encapsulate the complete computer configurations and can include the contents of local hard disks, RAM, and device configuration.

The Collective manages virtual appliances based on a novel, comprehensive caching protocol disclosed herein. The caching protocol is implemented in a fully distributed model where users can add and remove nodes (virtual appliances) from the infrastructure (the Collective) without central management. This cache-based distributed model is realized by storage devices implementing self-maintaining, stateless, demand-driven virtual appliance transceivers (VATs).

As its name implies, a VAT transmits and receives virtual appliances in a distributed computer system such as the Internet or a proprietary network. To do so, each VAT has a manager for requesting and receiving virtual appliances from, e.g., a virtual appliance repository, over the network. The VAT also provides a user interface to enable a user to log in and run whichever virtual appliance is desired.

A VAT-implemented storage device (hereinafter referred to as "VATISD") therefore can readily change a host computer, e.g., a personal computer, into a powerful fixed function appliance that can read, execute, and backup any compatible virtual appliances available on the network. The VATISD can be implemented internal (e.g., a local disk) or external (e.g., a compact USB flash drive, also known as keychain, thumb, or pen drive) to the host computer. Preferably, the VATISD is implemented as a small, bootable, portable device.

Implementing VATs in portable storage devices achieves another object of the invention, which is to enable users to run their programs and access their data, regardless whether they are installed/stored, on any suitable computer from virtually anywhere in the world. Currently, popular mobile computing techniques include carrying a laptop, which can be lost or stolen, and accessing a home computer via remote display, which is known for long user interface delays.

By plugging in a portable, bootable VATISD, a user can readily and easily assimilate most any computer into the Collective. The portable VATISD would also insulate or free the user from having to deal with software installed on the host machine. Working in concert with the caching protocol, the VAT utilizes the built-in storage of the VATISD to facilitate and/or further enhance network speed and connectivity. The VAT of the present invention employs a novel auto-charging optimization for optimal performance even over a slow link.

Since one or more virtual appliances are run on a local host computer and since virtual appliances can be large, the present invention provides several novel techniques for transferring large computer states, for example:

1. Capturing the differences between versions.
2. Paging in virtual appliances on demand, thereby effectively eliminating the need of moving the entire virtual appliances before execution begins.
3. Storing parts of the virtual appliances in a cache, thereby effectively reducing the communication time. The cache can reside in a local disk of a computer or a portable device, depending upon the implementation of the VATISD, as discussed above.

These techniques are possible because, in general, users of the Collective do not install software into virtual appliances. Publishers provide and manage all the software in virtual appliances. According to the invention, publishers publish updated versions of appliances through network-hosted appliance repositories. Self-maintaining VATs automatically find updated versions in the repositories, thereby eliminating the need for users to track software fixes. Because users do not install software, the publisher can update the virtual appliance automatically with greater confidence of results and do updates in a fairly coarse grained fashion (e.g., rewriting a disk partition to contain a new version of the software).

Virtual appliances can be connected together via a network into virtual appliance networks (VANs). A virtual appliance network contains the component virtual appliances along with a description of the network that connects them. A virtual appliance network can itself act as a virtual appliance. By enabling publishers to create virtual appliance networks, users would not have to configure and maintain the network that connects the virtual appliances, nor would they have to configure and maintain the software installed on the virtual appliances.

According to an aspect of the present invention, virtual appliances are treated as an evolving data set. Thus, for system administration and mobility, automatic techniques that are applicable to data, e.g., version control, compression, data differencing, are also applicable to virtual appliances. The present invention further enables users to customize virtual appliances. Those customizations are maintained across updates in separate storage.

The Collective provides users with complete, configured environments and boasts the following innovative features:

Configuring and networking virtual appliances into virtual appliance networks (VANs).

Distributing fixed-function virtual appliances as means to manage local and remote computers.

Storing active appliances in a repository and managing changes via version-control.

Updating application and operating system software by distributing complete virtual "hardware" machines (which includes operating systems) as generic data (i.e., virtual appliances) and executing the virtual appliances.

Fetching and running any virtual appliance on the network from virtually anywhere.

Implementing bootable mobile media with software that runs and fetches virtual appliances from the network;

Reducing response time of a remote virtual appliance via copy-on-write disks, demand paging, and (hash-based) caching, among others. This takes advantage of the presence of an older version of the virtual appliance.

Extending the functionality of a portable device, such as a USB keychain drive, by integrating it with software that automatically fetches latest data from the network.

The Collective is easy to manage, secure, and supportive of user mobility. In addition to automating system management, the Collective enables local execution, which performs much better than remote display. The Collective works across different network connectivities and has a low overall cost, making it not only a viable but also very desirable system management architecture.

Still further objects and advantages of the present invention will become apparent to one skilled in the art upon reading and understanding the preferred embodiments described below with reference to the following drawings.

DETAILED DESCRIPTION

Figure 1:
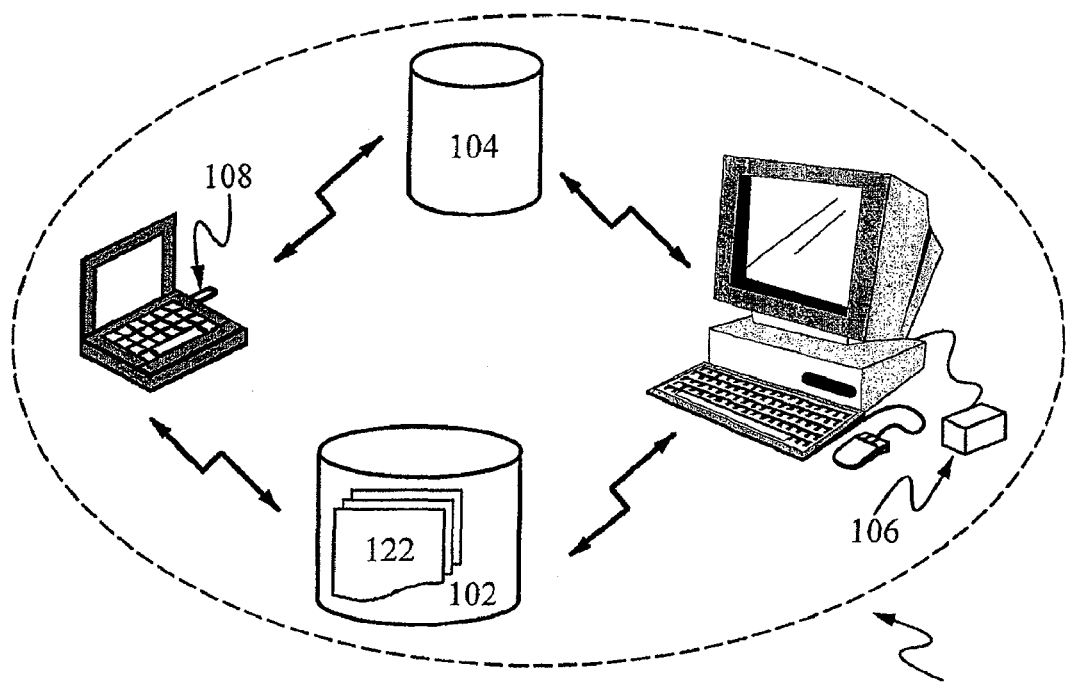
FIG. 1 illustrates an embodiment of the cache based system management architecture according to an aspect of the present invention.

In the following detailed description and drawings, like reference numerals, characters, shapes, and symbols may be used to designate identical, corresponding or similar components and elements. Further, as one skilled in the art will readily recognize, although exemplary values may be given herein, embodiments of the present invention are not limited to the same.

The Collective—A Cache-Based System Management Architecture

FIG. 1 exemplifies the cache-based system management architecture of the present invention. The Collective 100 includes a configuration language called the Collective Virtual appliance Language (CVL) for describing a plurality of virtual appliances, at least one virtual appliance repository 102 storing the virtual appliances 122, at least one user data repository 104, and a plurality of virtual appliance transceivers (VATs) implemented in a variety of storage devices (VATISDs) 106, 108. The physical components are distributed and communicate with one another via public or private, wired or wireless communication links. Below are described the components and infrastructure of the Collective, report experiments that quantified the Collective, and list characteristics and advantages thereof.

A virtual appliance repository provides a location where a publisher can post successive versions of an appliance and users can find them.

Once a version has been written to the repository, that version becomes immutable. Each version of an appliance has a CVL file. For VM appliances, the VMware virtual machine files (.vmx, .vmdk, and .vmss) are also stored. To save time, disk space, and bandwidth, the virtual disks typically contain only the changes from the previous version of the appliance.

Publishers create and update repositories through a Collective user interface command, or cui. The publisher runs the command cui create <repository> to create an empty repository at the file path repository. The publish operation cui publish <repository> <cvl> stores the files representing a virtual appliance as the latest version of the appliance in the repository. For all appliances, this involves copying the CVL file into the repository. For a VM appliance, the VMware configuration file contains a list of all virtual disks comprising the VM appliance, and the CVL file designates some of the virtual disks as data disks. Virtual disks not designated as data disks are assumed to be program disks. The publish operation copies the contents of the program disks to the repository but does not copy the contents of data disks. This means that an appliance repository only contains appliance software and does not store any data disk content.

A repository can be hosted anywhere in the file system where a user can create a subdirectory. In one embodiment, repositories are accessed and stored through SFS, which provides a secure access to a global namespace of files. SFS, a secure file system, is described in D. Mazières, M. Kaminsky, M. F. Kaashoek, and E. Witchel, Separating key management from file system security, in *Proceedings of the 17th ACM Symposium on Operating Systems Principles (SOSP '99)*, Kiawah Island, S.C., December 1999.

The Collective Virtual appliance Language (CVL)

The CVL supports composition, extension, and customization of a virtual appliance to be propagated to extended versions. The CVL has a generic syntax suitable for describing configurations of any types of objects and a set of predefined objects that model the semantics of virtual appliances.

An object may consist of component objects, a set of parameters, and possibly their values. An object can inherit from one other object. The value of a parameter is set using an assignment statement. Assignments in parent objects are executed before assignment in the derived objects, allowing specialized assignments to override the generic. The CVL is a configuration language whose goal is to generate parameter and value pairs for each object.

The semantics of virtual appliances are captured in the CVL by four predefined types of objects: an appliance base object for all appliances, an interface object representing virtual network interfaces in virtual appliances, an appliance extension base object, and a VAN base object. The latter two inherit from the appliance base object. The predefined objects and their parameters are used to configure and run virtual appliances.

The Virtual Appliance

Figure 2:
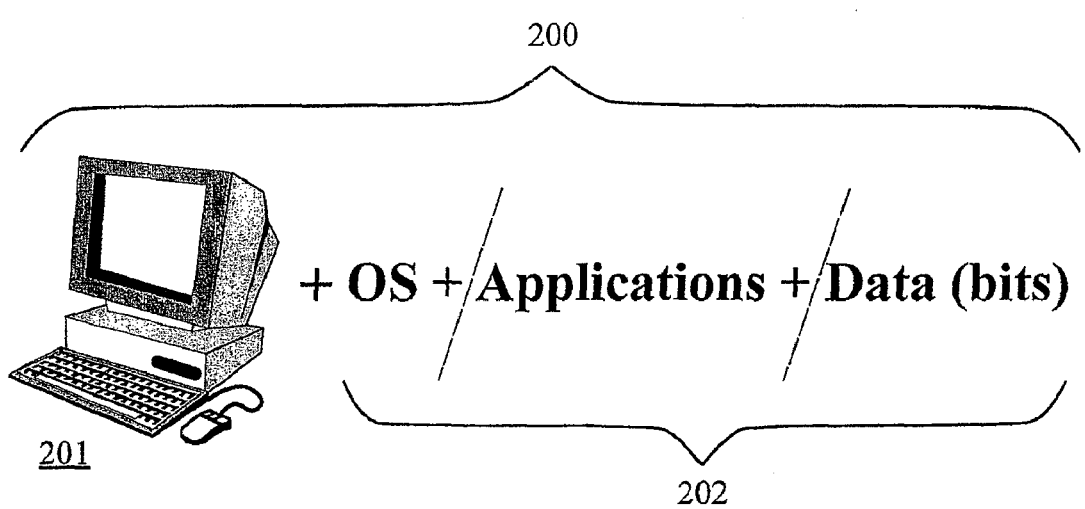
FIG. 2 illustrates the physical and digital components of a typical computer.

A virtual appliance is the software state that defines the behavior of a given platform, e.g., an x86 machine or a specific operating system. As shown in FIG. 2, a generic computer 200 can be seen as having a physical component 201 and a digital (virtual) component 202. The physical component 201 typically includes, among others, a monitor, a keyboard, and a box-like unit or case housing at least one disk drive, memory, and processor. The digital component 202 typically includes an operating system, applications, and data.

An x86 virtual appliance can encapsulate the entire computer states as data, including the contents of the disk (which may include an operating system such as the Microsoft® Windows XP® or Linux and all their respective application programs) and optionally the memory and processor states. The dashed lines in FIG. 2 indicate various levels of virtualization. For example, a Windows virtual appliance would run on a Windows platform. Virtualization at the x86 machine level is preferred for its generality. A virtual machine monitor can be used to bind the x86 virtual appliance to any x86 machine, as will be illustrated in a later section herein.

A virtual machine monitor is a layer of software that sits directly on the raw hardware and exports a virtual machine abstraction that imitates the real machine well enough that software developed for the real machine also runs in the virtual machine. Often, the same code can be run both on raw hardware and on a virtual machine.

Virtual machine monitors have several properties that make them ideal platforms for supporting virtual appliances. The monitor layer encapsulates all of the machine state necessary to run software and mediates all interactions between software and the real hardware. This encapsulation allows the monitor to suspend and disconnect the software and virtual device state from the real hardware and write that machine state to a stream. Similarly, the monitor can also bind a machine state to the real hardware and resume its execution. The monitor requires no cooperation from the software running on the monitor.

Virtual hard disks are especially powerful. The disks can be backed not just by raw disk devices but by files in the host operating system's file system. The file system's abilities to easily name, create, grow, and shrink storage greatly simplify the management of virtual hard disks.

Still, some I/O devices need more than simple conversion routines to work. For example, moving a virtual appliance that is using a virtual network card to communicate over the Internet is not handled by simply remapping the device to use the new computer's network card. The new network card may be on a network that is not able to receive packets for the virtual appliance's IP address. However, since the virtualization layer can interpose on all I/O, it can, transparent to the virtual appliance, tunnel network packets to and from the virtual appliance's old network over a virtual private network (VPN).

Every virtual appliance in the Collective is stored in a network repository. The virtual appliance transceiver (VAT) described in the following section is particularly created to retrieve virtual appliances from the repository over the network, bind them to the local host hardware, execute them locally, and transmit the altered virtual appliances back to the network repository. Note that, since software can be bound onto any hardware, applicable software licenses would need to be changed to reflect that usage.

The Virtual Appliance Transceiver (VAT)

Figure 3:
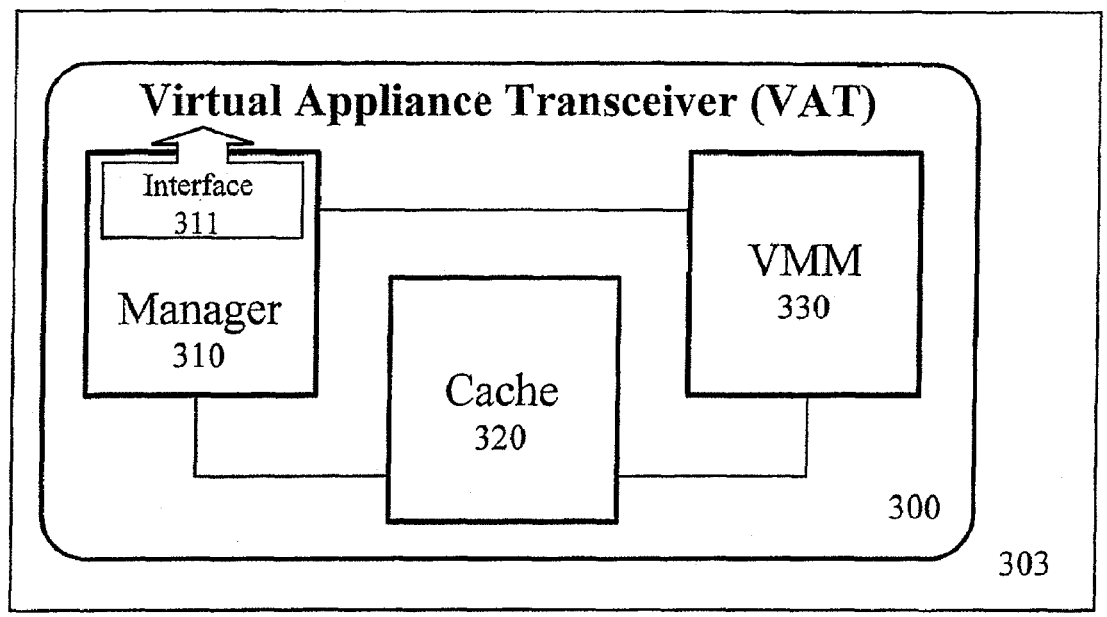
FIG. 3 illustrates an embodiment of the virtual appliance transceiver (VAT) according to an aspect of the present invention.
Figure 4:
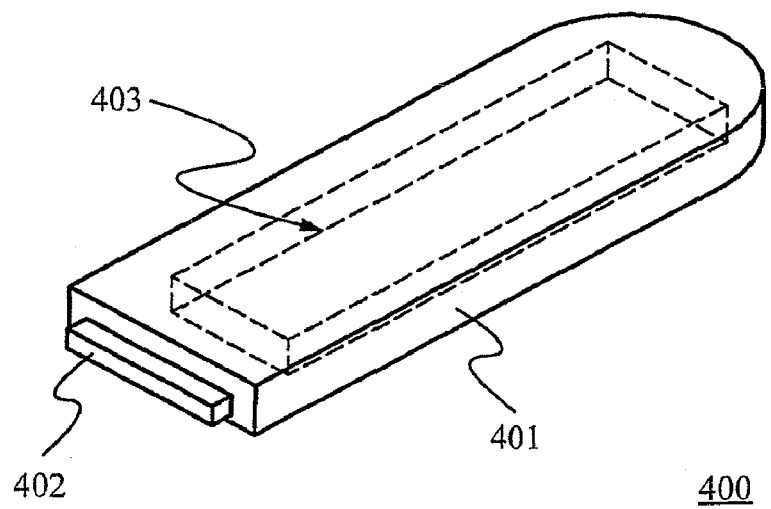
FIG. 4 shows an exemplary portable storage device implementing the VAT of FIG. 3 illustrates an embodiment of the virtual appliance transceiver (VAT) according to an aspect of the present invention.
Figure 5A:
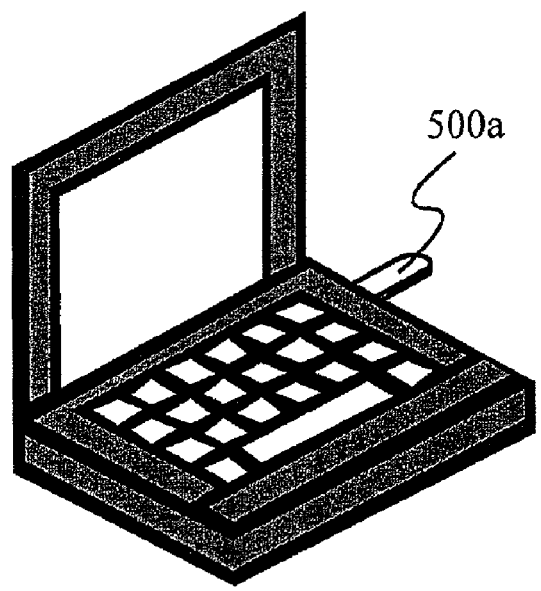
FIG. 5A shows a laptop hosting a portable VAT-implemented storage device (VATISD).
Figure 5B:
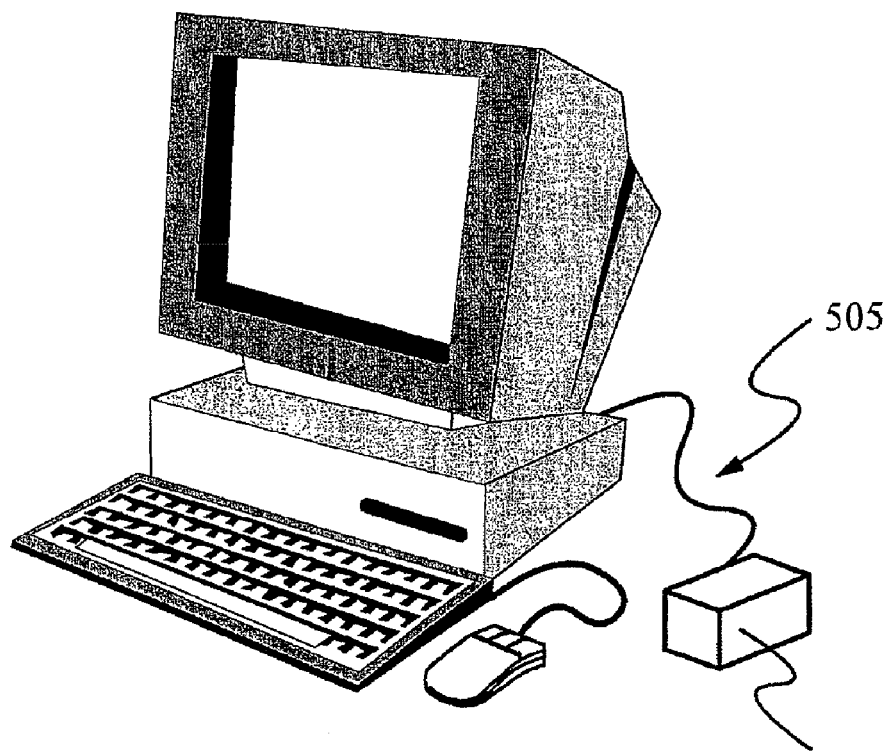
FIG. 5B shows a desktop computer hosting a VATISD removably attached thereto by cable.

As shown in FIG. 3, a VAT 300 includes a Manager 310, which includes an operating system with extensive device drivers and a user interface (UI) 311 for logging in and running virtual appliances, a caching wide area storage client 320, and a virtual machine monitor (VMM) 330, such as the VMware GSX Server 3.1 from VMware, Inc. of Palo Alto, Calif., USA. The VAT 300 resides in a storage means 303. FIG. 4 shows an exemplary embodiment where such a storage means 403 is embodied in a compact housing 401 of a portable device 400 having an interface 402. One skilled in the art will recognize that the portable device 400 is not limited to what is shown in FIG. 4. For example, FIG. 5A shows a VAT-implemented storage device (VATISD) 500a plugged into a laptop via, e.g., a universal serial bus (USB) interface. FIG. 5B shows a desktop computer hosting a VATISD 500b via a cable 505.

Generally, in the Collective, a publisher is someone who posts and updates virtual appliances and a user is someone who "subscribes" to the virtual appliances by way of a VAT. A person can be both a publisher and a user. The VAT performs authentication, obtains the latest copy of the subscribed virtual appliances from the repository, obtains user data relevant to the user subscribed virtual appliances, and backs up altered or newly created user data over the network while running the virtual appliances on the host machine.

During startup of a VAT, a user enters (via the VAT user interface) a username and a password. The VAT then uses SSH (secure shell) and the password to authenticate the user to a storage server, e.g., of a network repository. As part of the initial authentication, the VAT automatically sets up a key pair that will allow it to perform future SSH accesses into the storage server using a private key rather than the password. In lieu of SSH, other VPN technologies may be used to tunnel NFS.

The VAT user interface includes two web browsers. One browser allows the user to browse the Internet and subscribe to virtual appliances. The other lists the user's subscribed virtual appliances, showing status, and, more importantly, allowing the user to connect to subscribed virtual appliances. In some embodiments, these browsers are run from a virtual appliance, further shielding the VAT from known browser vulnerabilities. In some embodiments, the status window also informs the user about the automatic backup process running in the background, for instance, displaying in real time how much data remains to be backed up from the local storage device to the network user data repository.

The automatic back up process is described in detail herein in a later section. The Collective is particularly designed to be fault-tolerant. Even if the back up process was interrupted, the user could still logout without suffering from substantial data loss. Preferably, the user logs out after the back up process is complete, e.g., when a counter hits zero.

When a user clicks on or otherwise selects a virtual appliance, the user is "connected" to that virtual appliance. This simple connect operation makes using a virtual appliance as easy and intuitive as visiting a web site. If the user has never "visited" (connected to) a particular virtual appliance before, then the VAT Manager automatically creates a new subscription, instantiates a user disk, and starts the new virtual appliance. If the user has used the virtual appliance before, then the virtual appliance is started with the user's current user disk. If the virtual appliance was suspended, then it is resumed. All these actions are automated and transparent to the user.

Once a virtual appliance is started or resumed, a virtual machine monitor (VMM) console window automatically opens up for the user to interact with the virtual appliance. When the user closes the VMM console window, the virtual appliance is suspended, unless it has already been shutdown ("disconnected").

Major characteristics of VATs can be summarized as follows:

1. Fixed-Function

VATs have a simple fixed function: they only receive, execute and transmit virtual appliances. The limited functionality enhances its security and reliability. Note that this limitation does not cause the host personal computer to give up any generality; in fact, it gains generality because it can execute multiple virtual appliances retrieved from the network, each of which can have the functionality of a personal computer.

2. Auto-Updating

Even though VATs have a smaller feature set, it does not mean that they do not need to be updated. Its simplicity makes it easy to make it update itself automatically.

3. Stateless

The VAT has no indisposable state when not in use, as its cache only serves as a performance optimizer. More hardware may be easily added or one VAT may be replaced with another if its hardware fails, just like how telephone handsets or TVs are managed.

4. Pull Vs. Push Model

In the Collective, the VAT retrieves virtual appliances as they are demanded by the users, just like any other objects available over the web. This model eliminates the need for a central facility to provision resources and to distribute appliances on the machines a priori.

A VAT in essence is a self-maintaining, fixed function server, enabling the Collective to fully embrace a distributed computing model where every computer, including desktop computers, laptops, handheld computers, etc., in the network can be used as both a "server" and a "terminal". This self-maintaining characteristic enables the Collective to be adaptive and evolving, as individual users can independently choose to participate and use their own machines, as illustrated in the Collective 600 of FIG. 6, distributed in a network 699. Moreover, independent parties can put up repositories of virtual appliances as well as user data repositories.

The VAT Software and Autonomous Update Process

The VAT software comprises a compressed, read-only root file system image, a compressed Linux kernel, and a compressed initrd file system containing some kernel modules required for bootstrapping. Together, these three files form a version of the VAT software. Each version of the VAT software is accompanied by a version number and a signature, which is generated by a VAT publisher. A VAT disk contains a vat-repository file specifying the URL from which new versions of the VAT software can be downloaded as well as a public key to be used for verifying the authenticity of VAT updates. Upon initialization, the VAT disk is populated with one version of the VAT software and a vat-repository file that describes where new VAT software updates can be found.

All VATs run an update process to check for new versions of the VAT software and download them to the VAT disk when they become available. After downloading, the autonomous update process verifies the signature and automatically changes the boot sector to point to the new version. When managing multiple versions of VAT software on a disk, the VAT update process must obey the following constraints:

For proper operation of the VAT, the currently running version of the VAT software must not be modified or deleted.

To recover from an arbitrary crash, the boot sector must point to a functional version of the VAT software. Thus, the version of the VAT software pointed to by the boot sector cannot be modified or deleted.

To ensure forward progress, downgrading to an older version of the VAT software is not allowed.

In addition to the above constraints, the update process must update the VAT disk to the latest version, given that a newer version has been published and enough time has elapsed. To satisfy these requirements, the VAT disk must have enough space to hold three versions of VAT software: the currently running version, a potentially newer version that is pointed to by the boot sector and will be used at the next reboot, and an even newer, incomplete version that is in the process of being downloaded or verified.

Figure 7:
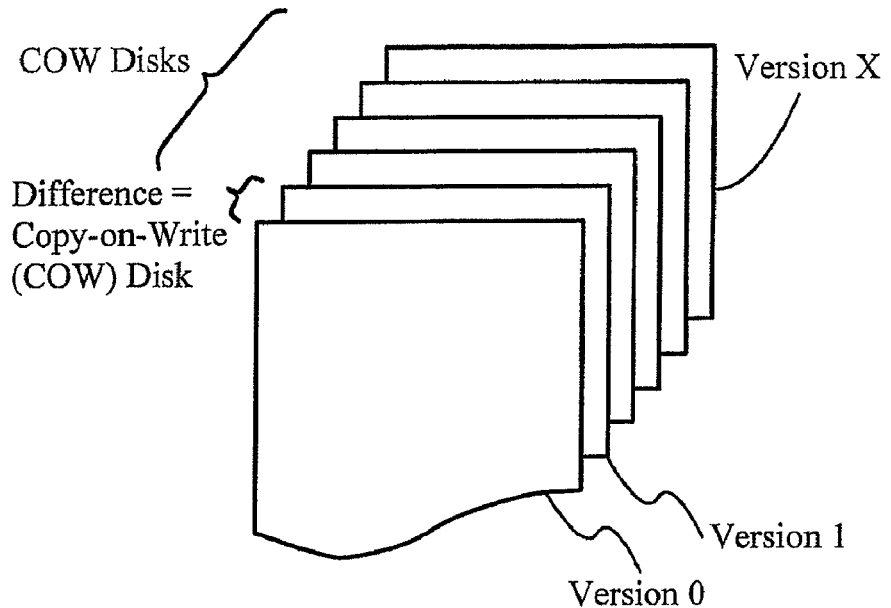
FIG. 7 illustrates how version virtual disks are created, according to an aspect of the invention.
Figure 8:
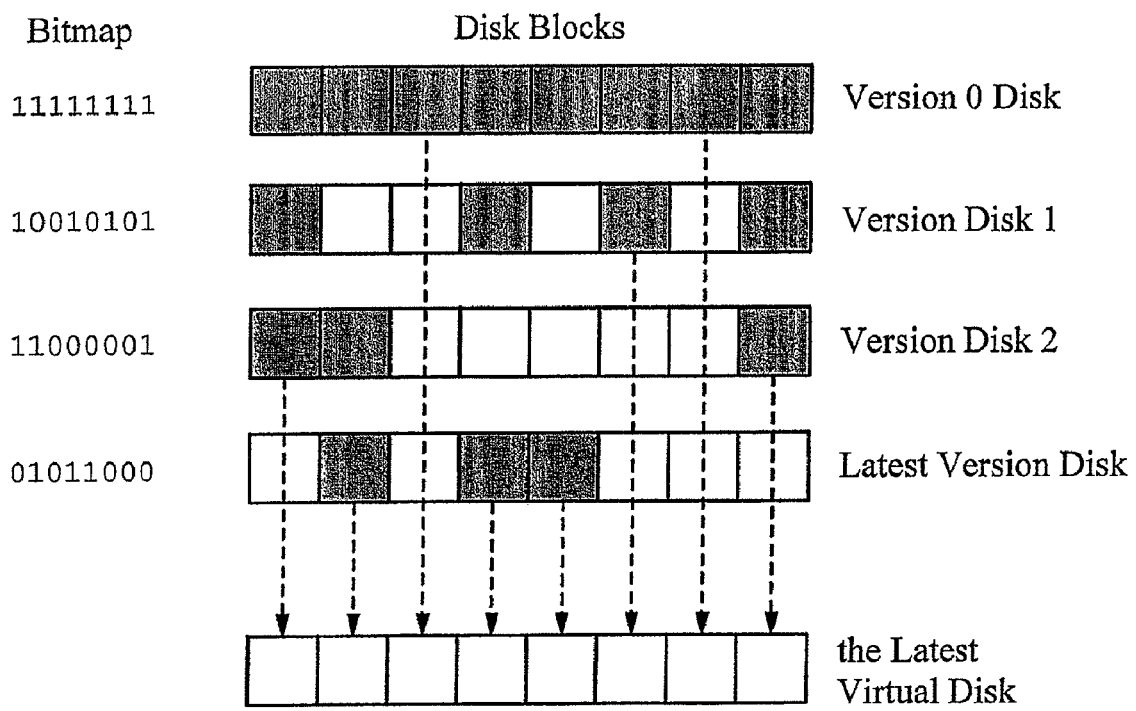
FIG. 8 shows an exemplary virtual appliance disk with blocks present in the corresponding version virtual disks.

In the current implementation, new versions of the VAT software are fetched as a whole by the update process, rather than incrementally. Fetching entire versions makes the update process simpler and works well when VAT software updates are rare. However, this is not required and other implementations are possible. The compression algorithm used for compressing the VAT file system image operates at block level, so each block is compressed independent of other blocks. As such, differences made to the uncompressed VAT file system may be captured and compressed versions of changed blocks can be distributed as incremental updates. FIG. 7 illustrates an embodiment in which version virtual disks are created by making copies of the disk blocks as they are modified, a technique which is sometimes referred to as the copy-on-write (COW) technique, according to an aspect of the invention. A virtual program disk is comprised of a version 0 disk and a series of version virtual disks each capturing differences from a previous version. FIG. 8 shows an exemplary virtual appliance disk with blocks (shaded) present in the corresponding version virtual disks. In some embodiments, the definition of the term "virtual disk" also applies to user disks.

In the current prototype, the size of one version of the VAT software is approximately 150 Megabytes (MBytes or MB). A 500 MB VAT disk accommodates three versions of VAT software along with some file system overhead. As the version sizes decrease/increase, the size of the VAT disk could be changed correspondingly.

The Collective Utility

In one implementation, a Collective Utility manages virtual appliances and hardware. The utility executes requests to start, stop, and update virtual appliances from users, and answers queries on the status of virtual appliances. It allocates hardware and network resources to virtual appliances and configures virtual appliances to use those resources.

A virtual appliance can be a network of virtual appliances, which is referred to as a virtual appliance network (VAN). For example, a groupware virtual appliance may include separate DNS, LDAP, web, and mail virtual appliances, connected by a virtual network, and protected by a firewall virtual appliance. By bundling appliances into VANs, the cost of network administration is amortized among users of the bundle. The term virtual appliance is used to refer to either a virtual machine (VM) appliance, or a virtual appliance network (VAN) made up of virtual appliances. To support customization, virtual appliances are configurable; the behavior of a virtual appliance can be changed by changing the values of parameters.

The Collective Utility includes a central cluster manager service and a host manager service for each computer in the cluster. The cluster manager accepts appliance management requests from users, decides on the allocation of resources across the entire cluster, and interfaces with the host managers, which are responsible for executing appliances on the respective hosts. The cluster manager also keeps track of the "truth" in the system, including the list of physical resources in the system, the virtual appliances that have been started, and the resources allocated to them. This information is stored on disk to survive cluster manager restarts.

The utility administrator is responsible for registering all the resources in the system with the cluster manager, so that it can keep track of the available resources and perform resource allocation to appliances. Using a command line tool, the administrator can register a host, specifying its resources-memory size and the maximum number of VMs hosted at any one time. In a particular example implementation, each registered host has Red Hat Linux 9, VMware GSX Server 2.5.0, and the Collective software installed. The administrator also registers a set of VLAN (Virtual Local Area Network) numbers and public IP addresses with the cluster manager. These VLAN numbers and public IP addresses are assigned to virtual networks and to network interfaces connected to the public Internet.

The utility administrator can restrict the appliances the utility runs by providing it with a blacklist of repositories and versions that should not be run. For example, the administrator may wish to place all appliances with known security vulnerabilities on the list. The utility will not start new appliances that use versions on the blacklist. However, the utility will not stop already running appliances that violate the blacklist; instead, the administrator can query the utility for these appliances. The administrator can then either ask users to update or can forcibly stop the appliances.

Before using the utility, a user first creates a new appliance by creating a CVL file that inherits from the appliance to be run. As part of writing that CVL file, the user sets the values of the parameters of interest. The following is an example of a CVL file created by a user for the Groupware appliance:

```
import {
    url => "http://virtualappliance.org/Groupware",
    cvl => "Groupware.cvl",
} Groupware;
AcmeGroupware extends Groupware {
    domain = "acme.org";
}
```

The user can then use the utility to start, stop, and update the appliance. Below, each of the available user commands are described in more detail along with an overview of an example implementation.

Starting a Virtual Appliance
The command
cui start <CVL> starts the appliance as specified in the <CVL> file. The handling of virtual networks is described first followed by the implementation of the command.

Virtual Networks

According to one embodiment, the component VM appliances in a VAN may be run on one or more machines. Each running VAN has its own Ethernet segment, implemented as a VLAN on the physical Ethernet. All VM component appliances of a VAN on each host are connected to a dedicated VMware virtual switch on the host, which is bridged to the VAN's VLAN. Physical Ethernet switches that recognize and manage VLANs may need to be configured to pass traffic with certain VLAN tags to certain hosts. Since an example implementation uses switches that ignore VLAN tags, no configuration is required.

The Collective also takes over the chore of assigning IP addresses to appliances. Each VAN is assigned a subnet in the 10.0.0.0/8 site-local IP address range, with the second and third octets of the address derived from the VLAN tag. So, each VAN has 256 IP addresses. Each virtual Ethernet adapter in each VM appliance is given a unique MAC address and an IP address from the pool of VAN's IP addresses.

In the case of sub-VANs, the internal interface of a gateway on a sub-VAN is assigned an IP address from the sub-VAN's IP address space. The external interface of the gateway is assigned an IP address from the address space of the parent VAN. Exported interfaces that do not connect the VAN to another VAN are given public IP addresses from a pool of IPs.

Network address translation (NAT) may be used to help route traffic between VANs and their parent networks. NAT is used between the public Internet and the VANs since site-local addresses are assigned to the VANs. Even though each VAN has a distinct site-local range, NAT is used between VANs and sub-VANs to avoid setting up routing tables. For this reason, a VAN's chokepoint appliance, such as a firewall or router, should provide NAT functionality.

Implementation

To implement the start command, the cluster manager parses the CVL file. It imports CVL files from repositories where necessary, remembering the version number. It sets up the virtual appliance's disks and then, if it finds that the virtual appliance's requirements can all be satisfied, brings up the virtual appliance. Note that a virtual appliance may be a VAN whose components may themselves be VANs. From now on, the term component VM appliances of a virtual appliance is used to refer to all the VM appliances defined by a virtual appliance, its components, its components' components and so forth.

In the first step, the cluster manager sets up the program and data disks for all the component VM appliances in the directory containing the CVL file. Every component VM appliance is given its own subdirectory. The manager creates a new copy-on-write demand-paged version for each program disk, and if a specified data disk does not already exist, an empty data disk of the size specified in the CVL file is created. The appliance is responsible for detecting an all-zero data disk on boot and initializing it appropriately.

In the second step, the cluster manager ensures that all the required services are available, required parameters set, and required resources reserved. It generates a dependency graph from the provides and requires variables of all component VM appliances, and propagates parameter values to all the CVL files. For fault tolerance reasons, the cluster manager determines which resources are available by computing all the resources currently in use by all the running virtual appliances. It then decides where each VM appliance is to be hosted and reserves the memory requested in the appliance's .vmx files. Next, the cluster manager reserves a VLAN for each subnet and an IP address for each VM Appliance.

In the third and final step, the cluster manager brings up the VAN. It first sets up the hierarchy of networks by instructing all participating host managers to allocate VMware virtual switches and bridge them to the appropriate VLAN. It then starts up the component VM appliances, possibly in parallel, in an order satisfying the dependencies. The VMware Scripting API is used to pass a VM appliance its parameters, including the assigned MAC and IP addresses, and to power it on. (A description of the VMware Scripting API is available on the Internet at http://www.vmware.com/support/developer/scripting-API/.) As soon as an appliance signals that it has successfully started, the cluster manager starts any appliances whose dependencies are now satisfied.

Stopping a Virtual Appliance
The command
cui stop <CVL> [<comp>]

stops the entire appliance defined in the <CVL> file if no <comp> is given, otherwise it stops only the component appliance <comp>. As in CVL, components are specified using a dot-separated path, for example sub-component f of component g is written g.f.

Stopping a virtual appliance is more straightforward than starting one. Component VM appliances are stopped in the reverse order of startup. To stop a VM appliance, the cluster manager uses the VMware Scripting API to instruct the virtual machine to stop. VMware passes the stop request to a daemon running inside the appliance, which then initiates a clean shut down. If the appliance does not shut down within 3 minutes, VMware forcibly terminates it.

Updating a Virtual Appliance
The command
cui update <CVL> [<comp>]

updates the entire appliance if no <comp> argument is given, otherwise it updates just the component <comp>. To minimize disruption, all the VM appliances need not be shut down to update a VAN; only the affected VM appliances are shut down. The cluster manager automatically derives the actions necessary to update an old version to the new by finding the differences between the two.

The cluster manager re-parses the CVL file, and simulates its execution to determine what the final state of the VAN should look like. It then finds the difference between that final state and the current VAN state, and determines the list of actions to transform the current state to the desired final state. The actions include:

1. Starting an appliance that is present in the final state but not present in the current VAN state.

2. Removing an appliance that is present in the current VAN state and not in the final state. First, it stops the appliance and the appliance data is moved to an attic directory. This prevents conflicts with any new appliance in future updates that might be given the same name as the removed appliance.

3. Updating a VM appliance if its version has changed. This involves first stopping the VM, copying over the new program disks, and restarting the appliance. If an update requires data disks be modified, the new version of the appliance should include logic that, on boot, detects whether the user data is in the old format and, if so, migrates the data to the new format.

4. Resending parameters to a VM appliance, if any have changed. This is done using the VMware Scripting API. An appliance wishing to respond to changes would run a daemon that checks for changes in the parameters and reconfigures the appliance appropriately. For example, when parameters are resent to a DHCP appliance, the daemon rewrites the DHCP configuration file and restart the DHCP server.

Costs of Virtual Appliances

The benefits of isolation and ease of management obtained from using virtual appliances are not without costs. First, starting up an appliance requires booting its operating system, which takes much longer than starting a service on an already booted operating system. Note, however, that this same procedure will bring up a pristine copy of the latest software on any machine. There is no extra cost associated with provisioning a machine to run a new service, or reinstalling the operating system to fix an error, or updating a software to a new version.

Virtual appliances also have higher disk and memory storage requirements and slower execution due to virtualization overheads. Fortunately, virtual machine technology continues to improve. Recent work on VMware ESX Server improves the utilization of physical memory by adapting the allocation of physical pages dynamically and sharing identical memory pages across virtual machines. Demand paging and copy-on-write disks may significantly decrease the cost of storing and sending updates using disk images. Finally, those skilled in the art will recognize that the approaches described herein are not limited to virtual machines; with SAN adapters and appropriate management support from the computer's firmware, virtual appliances could be booted on raw hardware.

The Cache

To mask the high latency and low bandwidth of wide area communication, the cache is designed to take advantage of large, persistent, local storage means such as hard disks and flash drives. The cache is optimized for holding virtual disks, which are gigabytes in size and mostly read-only.

Each VAT caches locally all or parts of the virtual appliances retrieved from the network repository and employs necessary techniques so that it appears to the user that these virtual appliances are readily available locally. The cache reads and writes remote repositories through a portable operating system interface such as the POSIX® standard file system interface. In the current implementation, common NFS (Network File System) serves as the remote file system. However, the cache can be configured to work with other file systems. Authentication is tunneled over SSH, as discussed above, to work around the poor authentication in NFS.

The cache subsystem has standard storage management functions, such as fetching new data not found in the cache and evicting data as space runs out. It also writes back data asynchronously for backup purposes and charges up the storage with blocks that are most likely to be used when new virtual appliances are used (subscribed). Many factors can be used to determine which blocks will be used, e.g., frequency of accesses by other users (popularity), user access history, etc.

Each applicable disk, including virtual appliance disks and user data disks, is divided into non-overlapping blocks. In an embodiment, each block is 256 kilobytes (KB) in size. This size is selected to provide the underlying file system bandwidth on large reads and writes.

Each block is a separate file in the file system hosting the cache. In an exemplary embodiment, each block is composed of sectors that can be independently present or absent. Each sector has 512 bytes of data, an 8-byte sector offset, and a 16 byte MD5 hash that covers the filename, sector offset, and data.

A sector is said to be missing from the cache if its MD5 hash is all zeros. A sector is corrupted if the MD5 hash does not match the data. In either case, the cache does not return the data. The MD5 cache provides an end-to-end check against the potential errors introduced by the file system, especially on crash. It is possible to scan the disk after a cache. However, it would impose an unacceptable delay.

The blocks are indexed by a combination of the full file path and the offset of the first byte in the block. MD5 is employed again as a hash function to condense the full file path and offset down to a constant 16-byte string. The 16-byte MD5 hash is translated to a 32-character ASCII string and looked up in the file system. Since many file systems do a linear search of directories, 256 subdirectories are created and each file is placed in a subdirectory based on the first byte of the hash.

Hash-Based Compression

To speed up data transfer over low-bandwidth links, transfer time is decreased by sending a hash of data blocks instead of the data itself. If the receiver can find data on local storage that hashes to the same value, it copies the data from local storage. Otherwise, the receiver requests the data from the server. This technique is referred to as "HCP," for Hashed Copy. The Collective uses HCP for demand paging disks and copying memory and disk images.

Identical blocks of data may be expected to be found between disk images and memories, even across different users' virtual appliances. First, the memory in most systems caches disk blocks. Second, most users in the Collective are expected to migrate between a couple of locations, e.g., home and work. After migrating a couple of times, these locations will contain older memory and disk images, which should contain blocks identical to those in later images, since most users will tend to use the same applications day to day. Finally, most users run code that is distributed in binary form, with most of this binary code copied unmodified into memory when the application runs, and the same binary code (e.g., Microsoft Office or the Netscape web browser) is distributed to millions of people. As a result, common blocks are expected to be found even between different users' virtual appliances.

Like LBFS, HCP uses a strong cryptographic hash, SHA-1. The probability that two blocks map to the same 160-bit SHA-1 hash is negligible, less than the error rate of a TCP connection or memory. Also, malicious parties cannot practically come up with data that generates the same hash.

HCP is intended for migrating virtual appliances over low bandwidth links such as DSL. Because HCP involves many disk seeks, its effective throughput is well under 10 Mbps. Hence, it is not intended for high-bandwidth LAN environments where the network is not the bottleneck.

Hash Cache Design

HCP uses a hash cache to map hashes to data. Unlike rsync, the cache is persistent; HCP does not need to generate the table by scanning a file or file system on each transfer, saving time.

The cache is implemented using a hash table whose size is fixed at creation. The first several bits of the hash key are used to index into the table. File data is not stored in the table; instead, each entry has a pointer to a file and offset. By not duplicating file data, the cache uses less disk space. Also, the cache can read ahead in the file, priming an in-memory cache with data blocks. Read-ahead improves performance by avoiding additional disk accesses when two files contain runs of similar blocks.

Like LBFS, when the cache reads file data referenced by the table, it always checks that it matches the 20-byte SHA-1 hash provided. This maintains integrity and allows for a couple of performance improvements. First, the cache does not need to be notified of changes to file data; instead, it invalidates table entries when the integrity check fails. Second, it does not need to lock on concurrent cache writes, since corrupted entries do not affect correctness. Finally, the cache stores only the first 8 bytes of the hash in each table entry, allowing storage of more entries.

The hash key indexes into a bucket of entries, currently a memory page in size. On a lookup, the cache does a linear search of the entries in a bucket to check whether one of them matches the hash. On a miss, the cache adds the entry to the bucket, possibly evicting an existing entry. Each entry contains a use count that the cache increments on every hit. When adding an entry to the cache, the hash cache chooses a fraction of the entries at random from the bucket and replaces the entry with the lowest use count; this evicts the least used and hopefully least useful entry of the group. The entries are chosen at random to decrease the chance that the same entry will be overwritten by two parallel threads.

Finding Similar Blocks

For HCP to compress transfers, the sender and receiver divide both memory and disk images into blocks that are likely to recur. In addition, when demand paging, the operating system running inside the virtual appliance essentially divides the disk image by issuing requests for blocks on the disk. In many systems, the memory page is the unit of disk I/O and memory management, so memory pages are used as the blocks.

The memory page will often be the largest common unit between different memory images or between memory and disk. Blocks larger than a page would contain two adjacent pages in physical memory; since virtual memory can and does use adjacent physical pages for completely different objects, there is little reason to believe that two adjacent pages in one memory image will be adjacent in another memory image or even on disk.

When copying a memory image, the file is divided into page-sized blocks from the beginning of the image file. For disk images, it is not effective to naively chop up the disk into page-size chunks from the start of the disk; file data on disk is not consistently page aligned. Partitions on x86 architecture disks rarely start on a page boundary. Second, at least one common file system, FAT, does not start its file pages at a page offset from the start of the partition. To solve this problem, the partition tables and file system superblocks are parsed to discover the alignment of file pages. This information is kept with the disk to ensure that properly aligned file data pages are requested when copying a disk image.

On a related note, the ext2, FAT, and NT file systems all default to block sizes less than 4 KB when creating smaller partitions; as a result, files may not start on page boundaries. Luckily, the operator can specify a 4 KB or larger block size when creating the file system.

Since HCP hashes at page granularities, it does not deal with insertions and deletions well as they may change every page of a file on disk or memory; despite this, HCP still finds many similar pages.

HCP Protocol

The HCP protocol is very similar to NFS and LBFS. Requests to remote storage are done via remote procedure call (RPC). The server maintains no per-client state at the HCP layer, simplifying error recovery.

The protocol is as follows. To begin retrieving a file, an HCP client connects to the appropriate HCP server and retrieves a file handle using the LOOKUP command. The client uses READ-HASH to obtain hashes for each block of the file in sequence and looks up all of these hashes in the hash cache. Blocks found via the hash cache are copied into the output file, and no additional request is needed. Blocks not cached are read from the server using READ. The client keeps a large number of READ-HASH and READ requests outstanding in an attempt to fill the bandwidth between client and server as effectively as possible.

The cache subsystem has a log mode in which it continuously backs up user data in order as generated to a user data repository; a checkpoint mode in which it takes snapshots of the user data at checkpoints and writes these snapshots to the user data repository; and a combination mode in which it automatically switches between the log mode and the checkpoint mode. In some embodiments, the switch is made when the amount of data saved under the log mode exceeds a predetermined threshold.

The Caching Protocol

Each virtual appliance running on the VAT is a cache client. By structuring each block as a separate file, disk layout management and much of the synchronization between the clients and the cache writer may be pushed into the file system.

Figure 9:
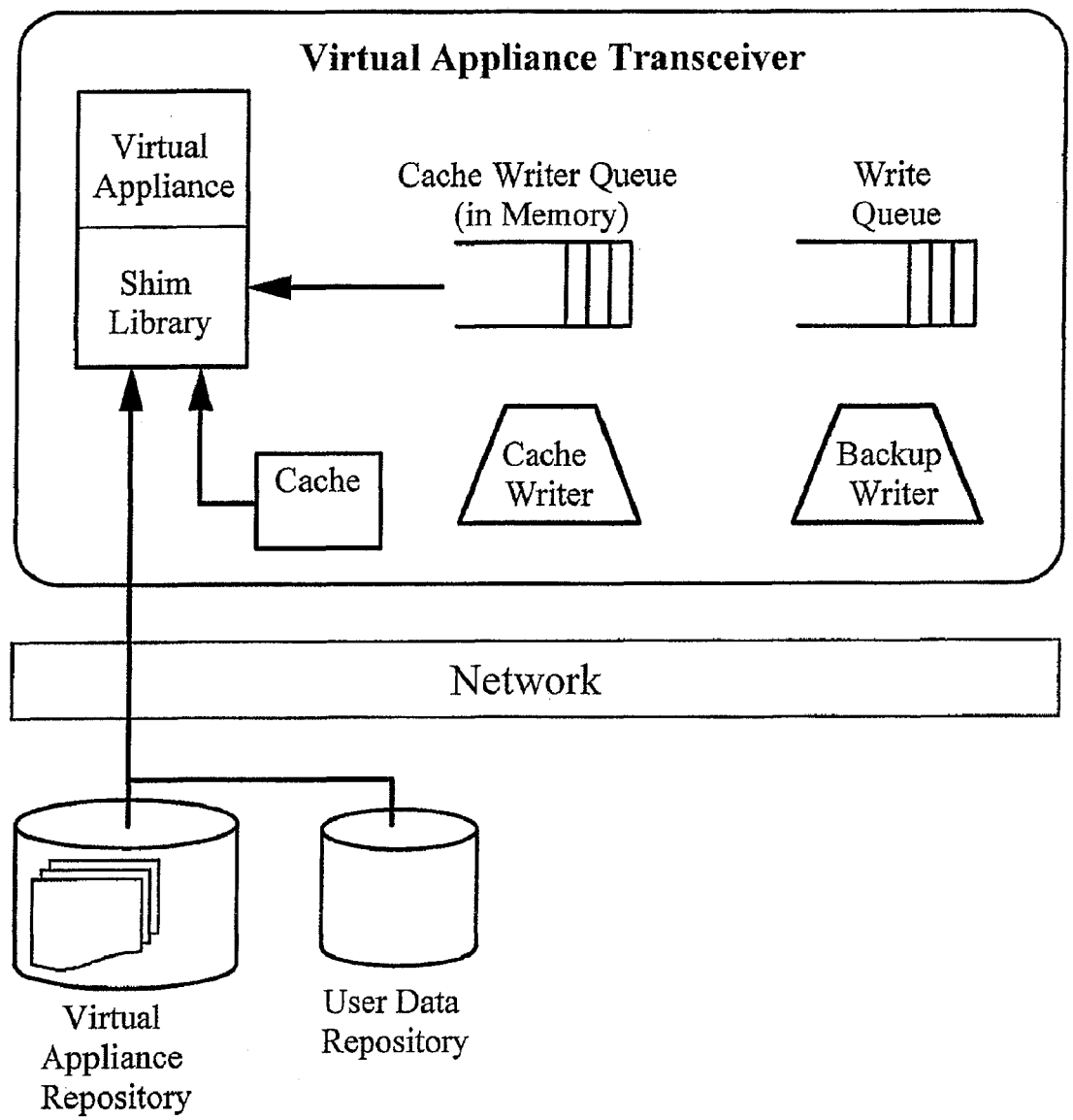
FIG. 9 exemplifies possible sources of read data.

A shim library is employed to interpose on user-initiated file system calls. The interposition takes place between each cache client and the standard C library. The shim library issues reads to the cache files directly, or on miss, to the remote storage directly. FIG. 9 illustrates an embodiment of a VAT with possible sources of read data such as the cache, the virtual appliance repository, and the user data repository. The shim library does not mutate the cache files directly. Instead, any insertions or writes to the cache are placed in a queue, which is called the cache writer queue.

Figure 10:
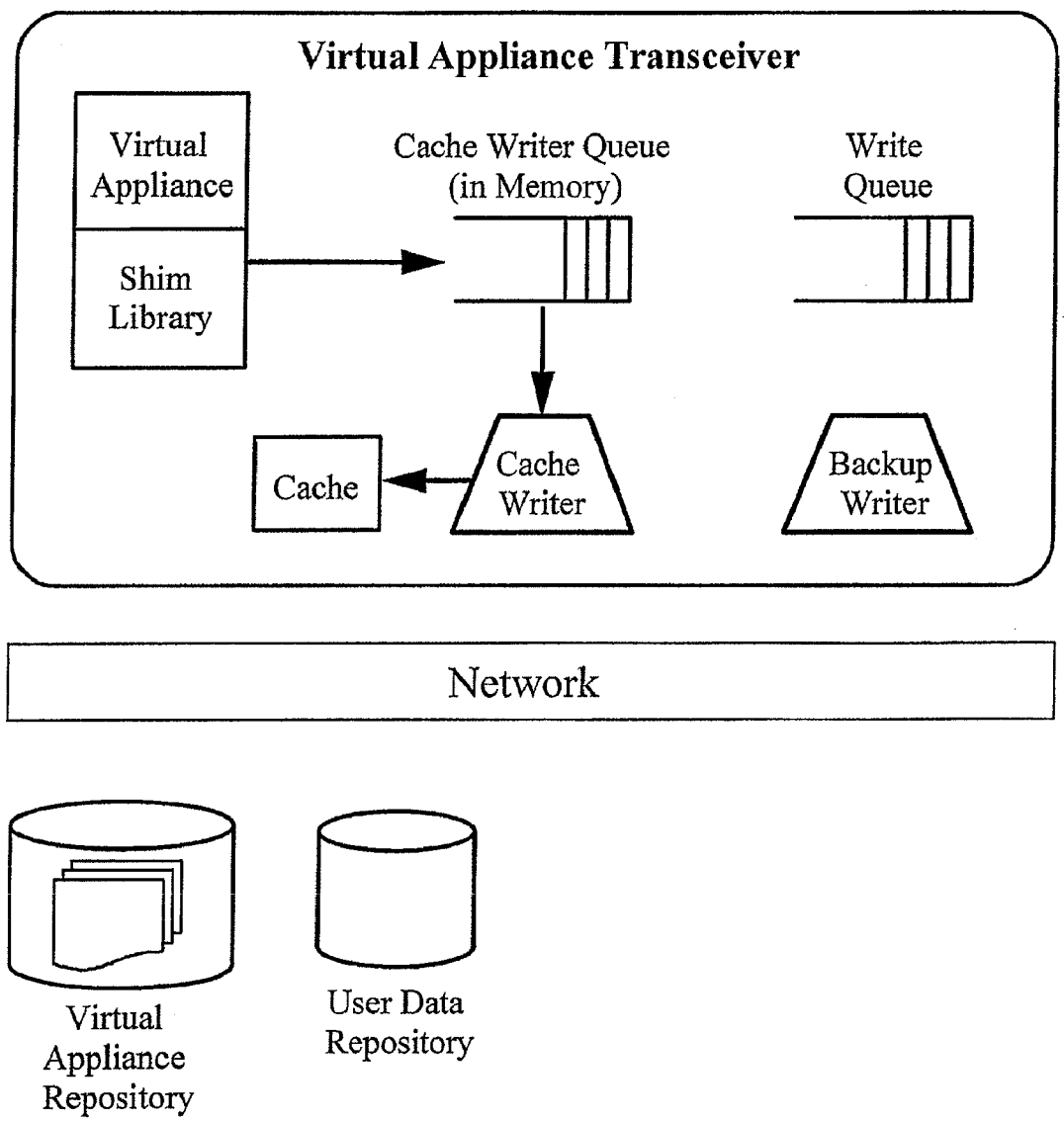
FIG. 10 exemplifies the insertion of the read data into a cache.
Figure 11:
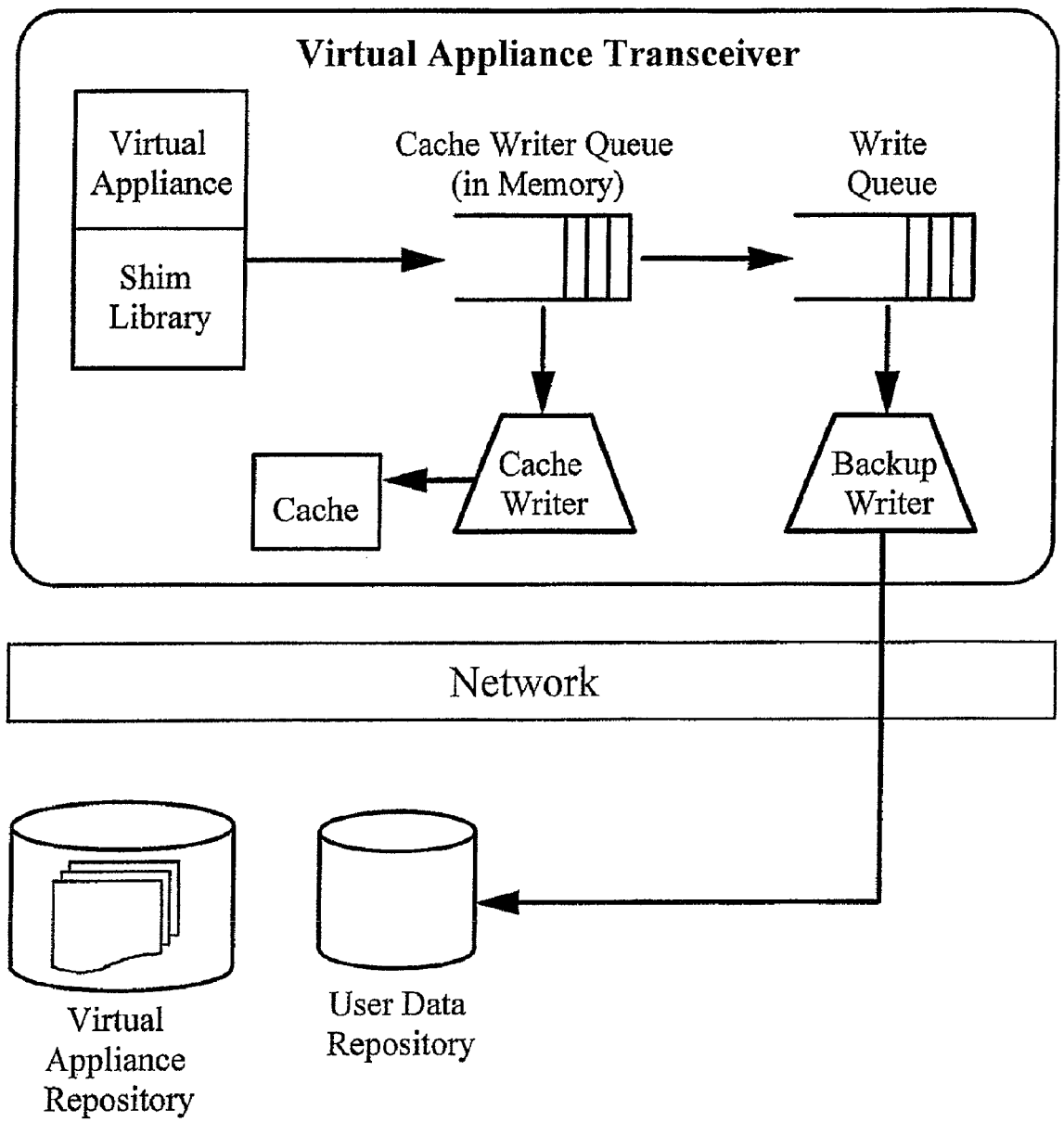
FIG. 11 exemplifies the write back process of newly created user data.

FIG. 10 illustrates how the cache writer inserts data into the cache. The cache writer process retrieves elements from the cache writer queue, and inserts them into the cache, evicting other data if necessary. If the inserted data is to be backed up, the cache writer queues the data up in the backup queue to be written back to the remote storage. A separate thread called the backup writer reads from this backup write queue and writes the data to remote storage. FIG. 11 illustrates how newly created user data is queued and written back over the network to the remote user data repository.

Centralizing mutations to the cache in the cache writer process eliminates many synchronization issues, simplifying implementation. As an added benefit, client threads do not block on writes or inserts, thereby overlapping cache writes with virtual appliance computation.

For the eviction algorithm, a bloom filter is employed to maintain the set of recently used blocks. Clients add blocks they read to this set. The bloom filter is stored on the VAT disk to improve the performance of the eviction algorithm across reboots. The file is memory mapped into the clients and the cache writer for fast reads and updates. No synchronization is necessary as the information is approximate.

In some embodiments, the cache writer writes out the in-memory cache writer queue and the backup queue to disk to speed up shutdown.

In general, appliances and user disks can have only one writer at any one time. The system disk is written by only the administrator of the disk. All the writes made by the user disks are discarded when the appliance is shut down. The user disk holds only a user's private data. Only one login session is given the lock to write the user's private data. If another session is found to hold the lock already, the user can choose to break the lock, or not to continue with the session.

This simple model suffices because users could carry their session with them wherever they go on their portable VATISD. This model not only simplifies the implementation but also eliminates the user's frustration of resolving conflicts.

Invalidation happens only when starting an appliance. The VAT contacts the repositories to see if there are any new versions of the virtual appliance program disks being used. As a result, any new versions of program disk published take effect on reboot. This ensures that the appliance remains consistent while the operating system is running. The VAT writes back data as fast as the network permits.

Cold misses can seriously degrade the performance of a system. Virtual appliances are large and wide area network bandwidth can be low. A standard demand-driven caching protocol can cause uses of any new features in the system to be dreadfully slow. Cold misses may be minimized by taking advantage of the large capacity of the cache to fetch and store data before it is used, with a focus to optimize the performance via an automated technique or process called "charging," which will be described in more detail in a later section.

The charging process automatically populates the cache of a VATISD with the predetermined blocks of a virtual appliance, somewhat like charging the batteries of a portable device when first purchased.

In the above model, user's documents and settings are stored on a virtual user disk attached to an appliance. That user disk is backed up asynchronously over the network by the VAT.

Appliances can nevertheless simultaneously use network file systems, like Coda, AFS or NFS, to access user data and settings.

The Client Shim Library

The cache writer queue between the shim library and the cache writer is implemented in a shared memory region. The cache writer queue can be made large, e.g., tens of megabytes, to absorb bursts of cache traffic to slow storage. The cache writer queue may often be close to empty. The danger of losing megabytes of updates on a crash is therefore minimal, although the possibility exists.

When the shim library receives a read request for a file in the cache, it must first consult the cache writer queue, because the queue often contains writes that have not been applied to the disk. Since overlapping writes may be present, the whole queue is scanned. This queue scanning may take less than 10% of the total cache read time. If the read cannot be satisfied by the data in the queue and on the disk, the shim library reads from the remote storage, generates an insert request, and places it on the queue.

In the prototype implementation, the appliance repository is an NFS server that stores the read-only appliance program disks (files). The performance of NFS is generally considered poor on high latency digital subscriber line (DSL) links. Consequently, querying the server for the status of these files can be expensive. This is solved by caching the metadata locally. That is, when the user subscribes to a virtual appliance, the cache fetches the metadata for all the program disks of that virtual appliance and caches it locally. Subsequent accesses to the metadata of these files are serviced from the local metadata cache. The client shim library intercepts metadata queries like the Unix stat call and services them from the metadata cache, if the files are present there.

Charging the Cache

The demand paging approach may be observed to work well over a DSL link on occasional cache misses. However, sustained demand paging of an appliance's blocks results in sluggish interactive behavior. As an example, when an application is started for the first time inside an appliance, many disk blocks are fetched one after the other, causing poor interactive performance. In some embodiments, therefore, the cache preferably adopts a continuous charging approach described below.

The cache charging process is designed to use the spare network bandwidth to continuously charge a VAT cache with the predetermined repository blocks. To determine what blocks are most likely to be used, the Collective automatically keeps track of which disk blocks of the virtual appliance on a server are popular. The popularity of blocks is computed using the access patterns or knowledge gained from users of the Collective. It is almost certain that the relevant blocks would already be in the cache when the user starts a new appliance or uses a new feature inside a subscribed appliance.

When a new virtual appliance is encountered, the predetermined blocks are retrieved by the charging process in the background. The charging time depends on the available network bandwidth. As demonstrated herein, even if it takes a while on a slow network, the charging process is fully automatic and foolproof. Charging thus mitigates or masks network latency. By streaming data, rather than demand paging, charging also utilizes network bandwidth better. It puts spare network resources to good use and provides better user experience.

In practice, only a relatively small fraction of the blocks in operating systems and applications may be used. For example, blocks needed for boot up, though infrequently used in a session, are requested in every session and are thus considered popular. Similarly, blocks that are accessed during an application startup are considered popular. This observation is validated by experimental results presented in a later section. Thus, the cache only needs to be charged with a small fraction of the total virtual appliance blocks to provide significant performance benefits.

The charging process is relatively straightforward, partly because users share their virtual appliances in the Collective. Each repository maintains statistics on the popularity of virtual appliance blocks residing therein. The shim library in the VATs optionally logs all virtual appliance program disk accesses to a compressed file stored in the repository. A charging server located at the repository uses these traces to compute access counts for blocks in each virtual appliance. Blocks are then ordered per popularity based on these counts. The counts are periodically aged to account for dead blocks as a result of appliance updates. These statistics are used by the VAT to background fetch the most popular blocks that are not already present in its cache. The list of popular blocks is also used to avoid evicting these blocks from the cache, even though they might not have been accessed for a period of time.

The Prototype VAT and VAT-Implemented Storage Device (VATISD)

The prototype VAT software is built on Knoppix® to support a wide range of hardware. As is known in the art, Knoppix consists a bootable CD (Live CD) with a collection of GNU/Linux software, which includes most of the drivers available for Linux today. The Live CD can automatically detect available hardware at boot time and load appropriate Linux drivers accordingly. The prototype VAT retains these advantages of Knoppix and further integrates a variety of new functionalities, for instance, communicating with a hosted virtual machine monitor, such as the aforementioned VMware GSX server to provide a uniform VM interface independent of low level hardware details.

This design allows the same VAT software to be used on many machines without any per-machine modification or configuration, greatly simplifying the management of an environment with diverse hardware. The prototype VAT runs from a VATISD and treats software installed on the host machine as read-only, ensuring that the state of the host machine does not drift over time. For most problems with the VAT software, a reboot restores the host machine to a working state.

In one common situation where the VAT cannot configure itself without a user's help: to join a wireless network, the user may need to enter an SSID and WEP key.

As discussed above, each VAT resides in a storage device which can be made internal or external to a host machine. In the latter case, such a storage device can be a portable hard drive, USB flash drive, pen drive, thumb drive, keychain drive, microdrive, or the like. Portable storage devices are cheap, fast, light, small, and dense. It is therefore quite practical and affordable to place a bootable VAT on such devices and use it to boot up most any computer.

As such, portable VATISDs can be categorically characterized as portable, self-contained (bootable), stateless, fixed function devices. Note that, although a portable VATISD is much cheaper, smaller, and lighter than a laptop, it is not a replacement for a laptop. A portable VATISD can only be used with a host, such as a personal desktop computer, laptop, handheld computer, or the like.

The design of a portable VATISD provides many more advantages, including the following:

1. Universality and Independence (of Host Computers)

Portable VATISDs enable users to run their programs and access their data, regardless whether they are installed/stored, on virtually any suitable computer in the world. In addition, they enable users to readily and easily assimilate most any computer into the Collective. The portable VATISD would also insulate or free the user from having to deal with software installed on the host machine, eliminating dependences on the host software. This approach leaves the host machine undisturbed, which is a significant benefit. Users need not worry about their family members, friends, relatives, visitors, etc. modifying their computing environments accidentally, although malicious visitors can still wreak havoc on their disks in the computers.

2. Performance

The portable VATISD approach simplifies the cache protocol and improves the caching performance with auto-charging, performing well even over a slow link. The cache in the portable VATISD serves as a network accelerator. This is especially important if users wish to use computers on low bandwidth networks. In fact, taking this to the limit, all the data of an appliance may be cached to operate in a disconnected fashion.

3. Fault Tolerance

Under typical operation, the portable VATISD does not contain any indisposable state when not in use. Thus, in the event that the portable VATISD is lost or forgotten, the user gets access to their data by simply inserting another generic VATISD and continuing to work, albeit at a slower speed.

4. Security and Privacy

This approach leaves no traces of the execution on the hosting computer. Data on the portable VATISD can be encrypted so they cannot be recovered if they are stolen or lost. However, there is always the possibility that the BIOS of the computer has been doctored to spy on the computations being performed. Concepts of the trusted computing platform architecture (TCPA) can be applied here to provide more security; hardware can attest to the portable VATISD the identity of the underlying software.

An additional benefit of a portable VATISD is that the VAT travels with the cache tailored to its usage. This eliminates the overhead seen when working on a machine for the first time.

Experiments

Five sets of experiments were conducted to validate and evaluate the Collective. We first use a set of micro-benchmarks to characterize the overhead of the system and the effect of implementing different portable drives. We next show some statistics of the virtual appliances that we have been using. We then provide evidence that charging is effective by showing that a small number of pages accounted for most of the accesses. Then we vary the amount of charged data to evaluate how that affects interactive performance. Finally, we evaluate the amount of changes made to the user data that must be backed up.

Micro-Benchmarks

We first establish some basic parameters of our system by using micro-benchmarks to evaluate specific aspects of its performance. All of the experiments, unless noted otherwise, were run on 2.4 GHz Pentium IV machines with 1 GB of memory and a 40 GB Hitachi 1.8" hard drive connected via Prolific Technology's PL2507 USB to IDE bridge controller. VAT software running on the experimental machines was based on Linux kernel 2.6.8.1 and VMware GSX server version 3.1. The file server was a 2.4 GHz Pentium IV with 1 GB of memory and a Linux software RAID, consisting of four 160 GB IDE drives. We use FreeBSD's dummynet network simulator to compare performance of our system over a 100 Mbps LAN to that over a 1.5 Mbps uplink/384 Kbps downlink DSL connection with 40 msec roundtrip delay.

Tables 1 and 2 below summarize the results of these micro-benchmarks. Table 1 shows the runtime of micro-benchmark experiments on different cache configurations when run over a 100 Mbps local area network (LAN) using a 1.8" disk VATISD. Table 2 shows the runtime of micro-benchmark experiments on different cache configurations when run over a 1.5 Mbps downlink/384 Kbps uplink simulated digital subscriber line (DSL) network with 40 msec roundtrip time (RTT) latency.

TABLE 1

|  | Windows reboot | Linux reboot | Kernel build |
|---|---|---|---|
| Local | 87 s | 44 s | 453 s |
| Charged cache | 72 s | 46 s | 485 s |
| Empty cache | 117 s | 61 s | 548 s |
| NFS | 123 s | 61 s | 547 s |

TABLE 2

|  | Windows reboot | Linux reboot | Kernel build |
|---|---|---|---|
| Local | 87 s | 44 s | 453 s |
| Charged cache | 90 s | 53 s | 476 s |
| Empty cache | 794 s | 212 s | 1287 s |
| NFS | 1002 s | 248 s | 1420 s |

Disk Performance

To evaluate the performance of different disks, we measured the time taken to boot the VAT software on an IBM ThinkPad® T42p laptop, from the push of the power button to the VAT being fully up and running. The results, shown in Table 3, indicate that the VAT boot process is reasonably fast, across different types of drives tested. The only exception is the 4 GB IBM Microdrive, connected to the system via a USB compact flash card reader. The card reader uses the compact flash protocol instead of IDE, resulting in poor performance.

TABLE 3

|  | BIOS | VAT |
|---|---|---|
| Lexar 1 GB Flash Drive | 8 s | 46 s |
| IBM 4 GB Microdrive | 10 s | 56 s |
| Hitachi 40 GB 1.8" drive | 10 s | 47 s |
| Fujitsu 60 GB 2.5" drive | 9 s | 48 s |

The same micro-benchmarks above were run. To emphasize disk performance rather than network performance, all caches are fully charged and all machines are connected over a 100 Mbps LAN. The results are shown in Table 4.

TABLE 4

|  | Windows reboot | Linux reboot | Kernel build |
|---|---|---|---|
| Lexar USB Flash Drive | 87 s | 39 s | 460 s |
| IBM 4 GB Microdrive | 158 s | 84 s | 532 s |
| Hitachi 40 GB 1.8" Drive | 72 s | 46 s | 485 s |
| Fujitsu 60 GB 2.5" Drive | 72 s | 40 s | 465 s |

The USB Flash Drive performs well on this micro-benchmark. However, its limited capacity would prevent it from running larger applications well. The flash drive has good read performance and zero seek time, which makes cache reads very fast. Flash write performance is not as high, but the VAT writes to the cache in the background, so slow writes do not slow down the system as a whole. The microdrive is relatively slow, in part because it used a slow flash card reader to interface to USB. Our study shows that the 1.8" hard drive offers the best combination of price, performance, and form factor.

Virtual Appliance Statistics

We have created and maintained three virtual appliances: a Linux Fedora Core 1, a Linux Fedora Core 2, and a Microsoft® Windows environment. The Fedora appliances were created from Red Hat Linux distribution. Some vital statistics of the system are shown in Table 5.

We show the number of versions created, either due to software installations or security patches. We also measure the size of all the version disks checked in for each appliance and the size of the latest version. Sizes are in GB. The Fedora® 1 core required many security updates, which have replaced major subsystems like the kernel and X server. While software was added to the Fedora® Core 1 appliance as it is found to be needed, the Fedora® Core 2 includes all the programs that come with the distribution and is therefore much larger. The Windows appliance has gone through two service packs and many security updates. The appliance initially contained Office 2000 and was upgraded to Office 2003. The appliance includes a large number of known applications such as Adobe PhotoShop®, FrameMaker™, and Macromedia DreamWeaver®.

TABLE 5

| Name | Versions | Total size | Active size | Cache size |
|---|---|---|---|---|
| FEDORA ® Core 1 | 20 | 5.7 | 2.8 | 1.4 |
| FEDORA ® Core 2 | 8 | 7.0 | 4.9 | 3.7 |
| MICROSOFT ® Windows | 31 | 16.5 | 4.5 | 3.1 |

We observe that these appliances are generally large, of the order of a few gigabytes. Changes to the system happen frequently. Thus, we saved a lot of time by having to just update one instance of each appliance.

The fourth column of the table shows an example of the cache size of an active user of each appliance. We observe that the cache size grows quickly and stabilizes within a short amount of time. It grows whenever major system updates were performed and when new applications were used for the first time. The size shown here represent all the blocks ever cached, and may include disk blocks that may have since been made obsolete. There had been no need to evict any blocks from the 40 GB disks.

Charging Technique

An important factor that determines the efficacy of automatic charging is the fraction of appliance data that need to be fetched to get most of the performance benefits. If the fraction is too high, it means that different users typically use different parts of the appliance. This results in the charger fetching extraneous data that would not be accessed by a user.

Figure 6:
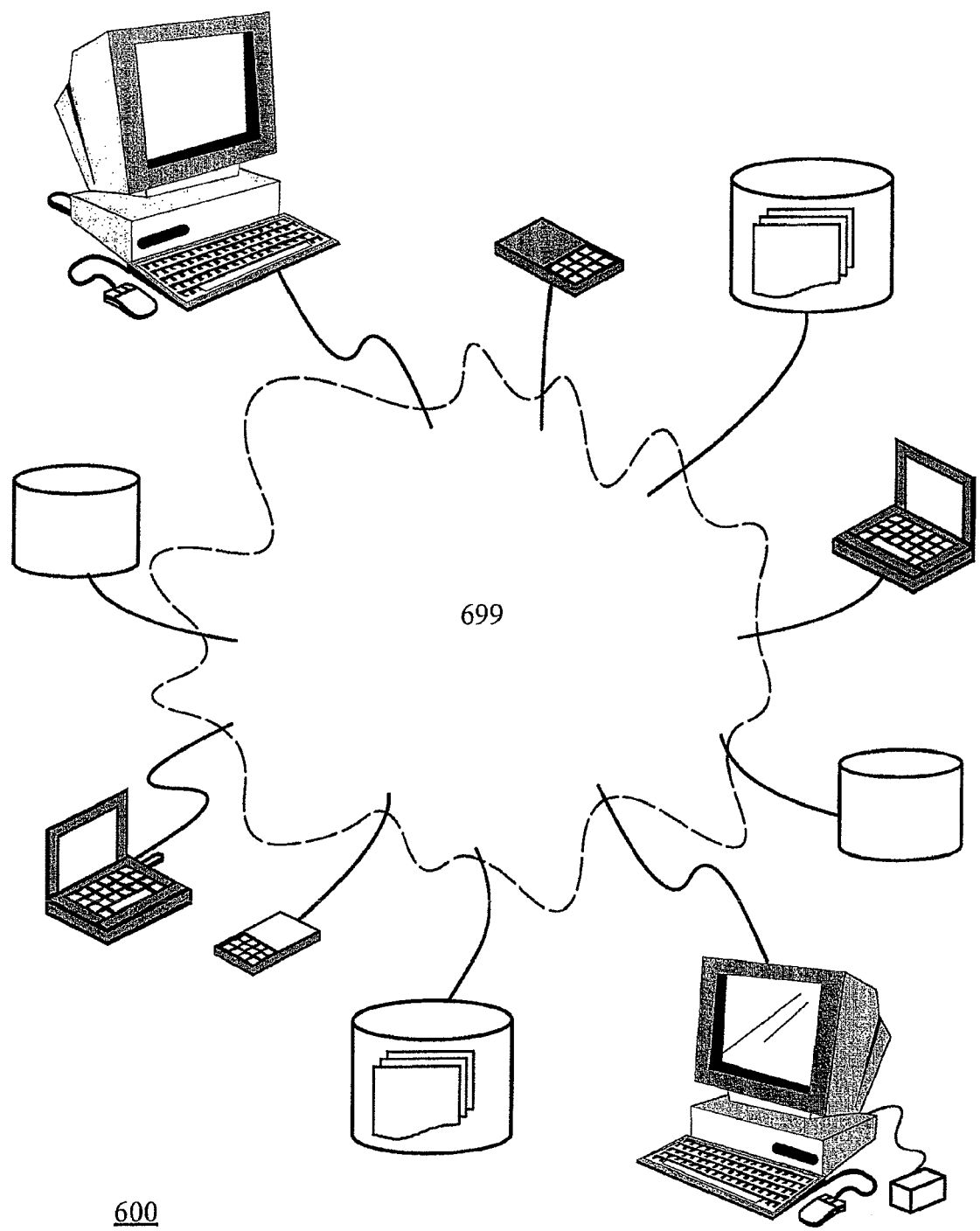
FIG. 6 shows an embodiment of the cache based system management architecture with various VATISD implementations, host computers, and network repositories, according to the present invention.

We performed the following experiment to understand this fraction for appliances in our system. We took 15 days of usage traces from users using our system for their daily work, and computed the access counts for blocks in each of the appliances. Sorting by these counts, we determine which data is most popular. FIG. 6 shows the cumulative access counts as we fill up a VAT's cache with data starting with the most frequently used data for the three appliances in our system.

From this experiment, we see that about 2.6 GB of the Windows appliance was accessed by any user in the system. The active size of the Microsoft appliance is 4.5 GB, as mentioned earlier. However, there were seven updates to the appliance during the 15 day trace collection period. These updates amounted to about 4.4 GB in size, and so the total size of active data for the purpose of our traces is 8.9 GB. In a similar manner, the active data size of Fedora® Core 1 and Fedora® Core 2 were 3.4 GB and 5.9 GB, respectively.

Thus, only a fraction (about 30%) of the Microsoft appliance was accessed by any user in the system. The corresponding numbers for Fedora® Core 1 and Fedora® Core 2 are about 51% and about 7%, respectively. We found that about 600 MB of data accounts for 90% of the accesses in the Microsoft appliance. This is about 6.6% of the total appliance size. The corresponding numbers for Fedora® Core 1 and Fedora® Core 2 are 13% and 1.6%, respectively. By fetching a small fraction of the appliance disks, this charging technique significantly reduces the chance of cold misses in the cache.

Online Backup

Preferably, user data should always be backed up onto network storage. To determine whether our backup mechanism works for real workloads, we collected usage traces for three weeks on personal computers of ten users running Windows XP®. These users included office workers, home users, and graduate students. The traces contain information on disk reads and writes, file opens and start and end of processes. We also monitor idle times of keyboard and mouse and record the machine to be idle if the idle time exceeds five minutes.

We expect that in our system the user would unplug his portable storage when he leaves his desktop computer. We simulated the traces on the cache running over a 384 Kbps DSL uplink to see whether there is any data left in the backup queue when he becomes idle. If the backup queue is empty, then the user could lose his portable storage with no adverse effects.

To perform the simulation, we divided the disk writes into user data and program data. Program data consist of the writes that are done in the normal course by an operating system that need not be backed up. Examples of program data include paging, defragmentation, NTFS metadata updates to program disk, and virus scans. User data consists of the data that the user would want to be backed up. This includes email documents, office documents, etc. We categorize internet browser cache, and media objects such as MP3 files, that are downloaded from the web as ephemeral user data and do not consider them for backup.

On an average, for our traces, we observe that about 9% of the writes were user data, about 3% were user ephemeral data, and the rest were program data. We further observe that most of the time the backup queue size is zero when the user becomes idle. This suggests that online backup works well even over a DSL link. In the worst case, the backup queue size is only about 35 MB, which takes less than 15 minutes to backup over a relatively slow DSL uplink.

User Experience

Below we describe some of the Collective's real life uses.

1. New Equipment Deployment

In the Collective, plugging in a new VATISD into a brand new computer makes it usable immediately. This eliminates the conventional need to install all the software from scratch.

2. Complex Computing Environment Distribution

Traditionally, even if one is experienced in doing so, it would take a nontrivial amount of time to create a complex computing environment, such as a recent compiler research project that required many software tools and infrastructures including Java, Eclipse, the research compiler system, BDD libraries, etc. In the Collective, this task is greatly simplified by creating a virtual appliance with all the necessary software, which can then be accessed from any VATISD virtually from anywhere.

3. Multiple Accesses of Different Platforms

Since a virtual appliance encapsulates the entire system state of a computer and since multiple virtual appliances can be run at the same time, the Collective in fact enables a user to access more than one computing environment or platform essentially simultaneously. As an example, a Collective user is using both a continuously maintained Linux and Microsoft® Windows environment at the same time.

4. Distributing a Centrally Maintained Infrastructure

An entity such as a company or a university may maintain a pool of computers that host all the software for various reasons, e.g., course assignments. Each of these machines is individually managed, usually by a system administrator or information technology (IT) staff. In such a centrally maintained infrastructure, multiple computers may be shared by many users. It is possible that some users may have newer, more powerful personal computers and/or laptops than those computers in the entity infrastructure. The Collective allows the exact entity computing environment to be virtualized, encapsulated, and distributed such that a user can run it on his/her own machine. Yet the control of system maintenance remains unchanged. What is more, it is easier to maintain all these machines because each virtual appliance only needs to be updated once for all the users to benefit from it. This feature is particularly useful for systems with a high frequency of update activities.

Software Management

Software upgrades are a common system administration task. Consider an environment where a collection of machines maintained to run exactly the same software configuration and users' files are stored on network storage. In a virtual appliance based system, the administrator can simply distribute an updated virtual appliance to all the machines. Assuming that the machines already have the previous version of the virtual appliance, only the latest COW disk containing all the changes need be sent. Using HCP to transfer the COW disks may reduce the transfer amounts to levels competitive with or better than current software install and update techniques. Three system administration tasks are described in the following paragraphs: upgrading an operating system, installing software packages, and updating software packages.

Operating System Upgrade

A full operating system upgrade will be a lengthy operation regardless of the method of delivery, due to the large amount of data that must be transferred across the network. In this case, the system administrator is likely to start from scratch and create a new root disk, instead of updating the operating system and capturing the changes in a COW disk. Use of virtual appliances may be an advantage for such upgrades because data transfer can take place in the background while the user is using an older version of the virtual appliance being upgraded (or a completely different virtual appliance).

Software Installations and Updates

To perform software installations, the virtual appliance is booted by the administrator logged in as root, a new package downloaded and installed, the software configured, and the virtual appliance saved as a child of the original one. The child virtual appliance is migrated to another machine that already has the parent cached. To reduce the COW disk size, software packages are downloaded to a temporary disk which were manually removed from the virtual appliance after shutdown. The example software updates are not binary patches; as with an install, they included new versions of all the files in a software package.

Transfers of small installations and updates may be dominated by the installer rewriting text databases of available software. Hashing sometimes saves time by not having to send the entire database, but not always, due to insertions that change all the pages. On larger installs, the cost of transferring the disk via HCP is near that of the original package; the overhead of the installer database is bounded by a constant and gzip does a good job of compressing the data. For larger updates, HCP sent less data than the packages because many of these updates contained only minor changes from previous versions (such as security patches and bug fixes), so that hashing found similarities to older, already installed packages.

Distributing COW disks via HCP is a reasonable alternative to current software install and update techniques. Package installations and upgrades incur a relatively low fixed cost, so further benefits can be gained by batching smaller installs. In the case of updates, HCP can exploit similarities between the new and old packages to decrease the amount of data transferred. The convenience of a less tedious and error-prone update method is another advantage.

Characteristics and Advantages of the Collective

By turning computer states into data and managing them accordingly by caching, an unconventional approach to managing systems is taken. From the real life experiments and user experience described above, it is apparent that this unconventional approach has given the Collective advantageous characteristics such as:

Mobility

Figure 12:
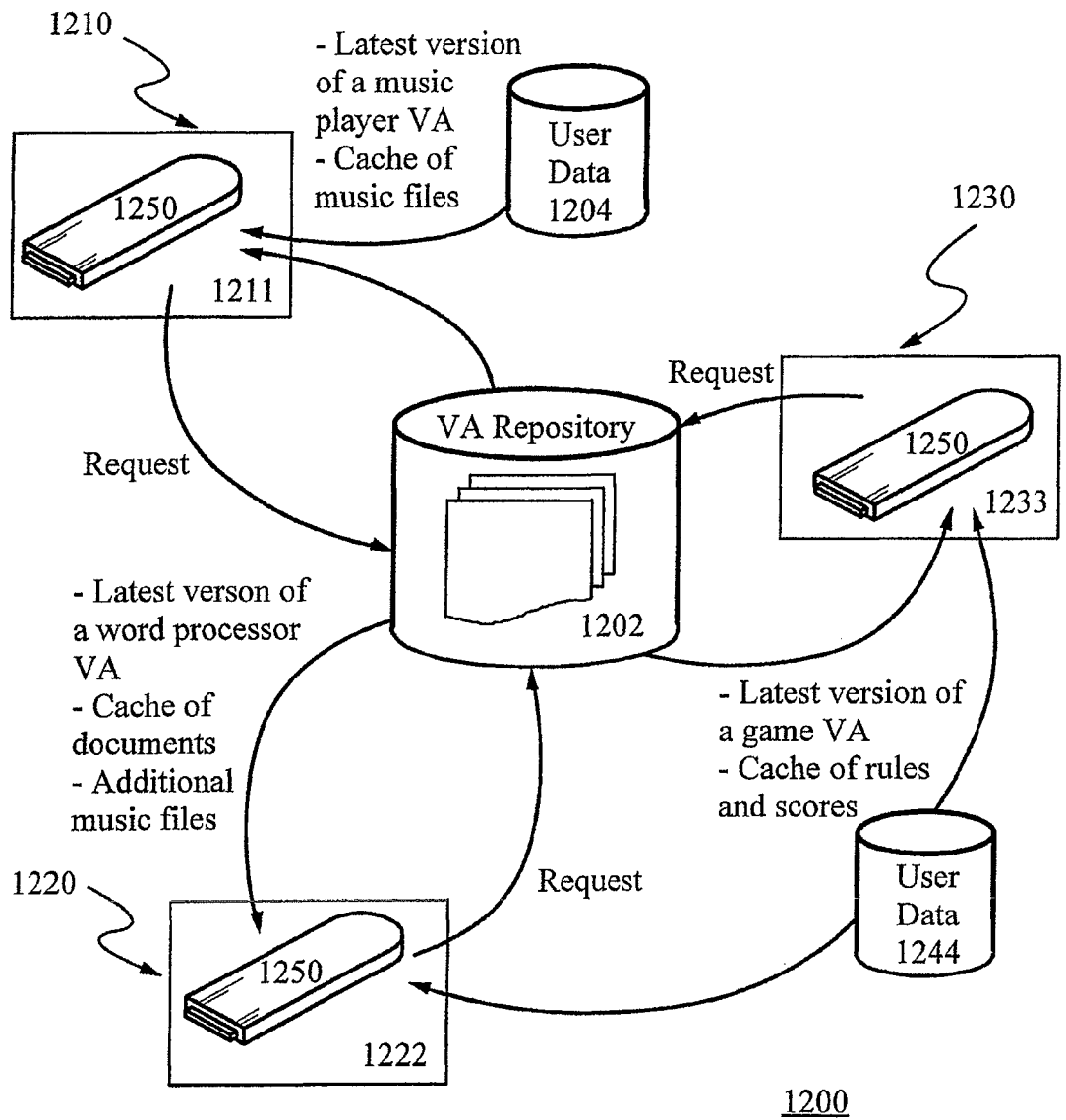
FIG. 12 illustratively shows how the cache-based system management architecture disclosed herein enables mobile computing for a user with a single VATISD, according to an aspect of the invention.

The Collective naturally supports mobility since it is agnostic to the instance of the machine used. As illustrated in FIG. 12, from different locations 1210, 1220, and 1230, a user with a portable VATISD 1250 can effortlessly subscribe different application virtual appliances, e.g., a music player, a word processor, and a game, that are posted and maintained at a network virtual appliance repository 1202. At each location, the same VATISD 1250 is connected to different hosts 1211, 1222, and 1233, respectively. Relevant user data such as music files, documents, and game rules and scores are cached/obtained from separate user data repositories 1204 and 1244. The locations 1210, 1220, and 1230 could be home, work, café, airport, and the like. The hosts 1211, 1222, and 1233 could be a personal desktop computer, laptop, work station, etc., as illustrated in FIG. 6.

Flexibility

In the Collective, a VAT can be used to run any virtual appliance, and multiple virtual appliances can be run at the same time.

Performance

Because the computation is performed on the local computer, it is responsive and runs quickly. The novel caching protocol makes the system responsive even with new machines. The amount of data traffic is reduced by a couple of measures. One is capturing differences of virtual appliance versions in a copy-on-write (COW) format. Machines that already have a copy of the older version need only to fetch the differences. Another is separating the state of virtual appliances into three different kinds of disks according to their backup and update needs: system, user, and ephemeral. For an appliance user, the system and user disks need to be updated, but only the user disk needs to be backed up. Neither backed up or updated, the ephemeral disks hold data that stay with the VATISD, such as information particular to a log-in session and file caches. Examples include the swap space, temporary files, cached web pages and the memory state of a suspended virtual appliance. In this implementation, as long as the user returns to the same VATISD, he can resume his login session. In practice, most users are not willing to wait for the system to back up the session just so that the session can be resumed elsewhere without his personalized VATISD.

Network Connectivity

The Collective can be used in networks with high or low bandwidths by adapting the caching protocol to different levels of connectivity. In some cases, the Collective can even support disconnected operation by caching the entire virtual machine on the local host a priori.

Error Recovery

Collective provides several techniques to recover from human errors and/or malicious attacks over the network such as viruses or worms. In some embodiments, changes made to a user disk are separately stored on one or more version virtual disks in the user data repository. These version virtual disks can be discarded at the end of a user log in session such that the user disk is not affected by the changes. Alternatively, these changes can be committed back to the user data repository, thereby becoming the latest version of the user disk. In some embodiments, these version virtual disks can be deleted or ignored, thereby rolling back the user disk to a prior state.

Prevent Known Virus Attacks and Resilient to Unknown Virus Attacks

The Collective is secure because it is up to date with security patches. In addition, users can be less wary of taking actions that may compromise the system, for example, opening email messages. Should the system be infected with a virus, it is possible to roll back (revert) to the state before. This is especially important for naive users and also for new forms of viruses that the latest security patches have not covered yet.

In an experiment, we opened up a message containing the BagleJ email worm on a computer that has not yet been patched. Upon a reboot, the computer reverted to the pristine state it was in before the attack.

Eliminate Operating System Reinstallation

The Collective also advantageously eliminates the need for operating system reinstallation.

Conventionally, machines sometimes fail to boot, for example, due to a fatal error during a Linux kernel upgrade. Since the machines are automatically managed in the Collective, the end user does not perform upgrades, thereby avoiding machine boot failures from occurring at the first place. In addition, most of the incorrect actions can be undone by rolling back the version. In other words, the Collective is fault tolerant.

Automatic Software Installation

Although a VATISD with an empty cache can be used immediately, the communication can be very slow at the beginning, especially over a DSL link. It may be faster to either use the VATISD in a LAN environment first, or to charge the cache first before it is used over the DSL link. On a LAN, charging is fast. Alternatively, the host machine may be left connected to the network over the DSL link overnight, if necessary. Because the system is fully automatic and hands-free, performing or monitoring the software installation process need not be manually performed.

Automatic Update

It is generally hard to conduct experiments involving distributed users because the software being tested needs to be fixed and improved frequently especially at the beginning. Since each virtual appliance in the Collective automatically updates itself, we were able to make quick iterations in the experiment without having to recall the experiment. The user needs to take no action, and the system has the appearance of healing itself upon a reboot.

Functionality for the Common Good

By enabling an unlimited amount of participants including users and publishers to contribute and improve a common environment, the Collective would have much more functionality than any single user could build.

Low or No Risk to Try or to Join

It is easy to get users to try out the system because one of identical USB disk drives may be used to boot their computer. It does not disturb the disks on their computers and hence the existing computing environments.

Easy to Troubleshoot

Especially with a portable VATISD, it is easy to troubleshoot the Collective. Since the system administrator would have VATs and virtual appliances identical to those subscribed by a particular user, problems encountered by that user are easily replicable.

Support Legacy Machines

Unlike newer machines, older machines lack the BIOS that allows the system to be booted up from a USB drive. This problem may be solved by providing a CD that will mount the USB drive and then boot from there.

Low Management Cost

The management manpower required in the Collective is independent of the number of desktop computers in an entity and whether the entities are local or remote. It is proportional to the number of different software configurations used, rather than the number of hardware installations. To provide management functions, generations of virtual machines are organized in a series. Users "subscribe" to a virtual appliance when they first use the appliance, and they get the latest generation of the appliance upon each boot-up. In the Collective, contents of the local (host) systems are just caches of the master version of the appliance and user data. In maintaining a master copy of both appliances and user data on the repositories at all times, the system provides both automatic software and system/data backups. Updating the master copy of an appliance automatically updates all the subscriptions of the appliance. If an appliance is used by just one user on just one machine, the Collective is still valuable in providing backup service for both user data and the appliance state, if so desired.

Overall Cost Effectiveness

The Collective reduces the manpower needed to maintain user desktops. In addition, although the approach is unconventional, the Collective can be deployed easily and relatively inexpensively onto existing infrastructures, as described above. The improved management could increase user productivity and the improved security can prevent catastrophic damages and the costs associated with recoveries. As a result, more users, for instance, employees, can work remotely and securely. Note that while this system broadens employee access outside the office, the system is highly secure.

The success of reducing management cost by amortization depends on the effectiveness of reuse. The Collective maximizes reuse in the following ways:

Multiple Appliances

The VAT can execute multiple virtual appliances at the same time. This means that, for instance, employees can share a common work appliance while using a separate appliance tailored to personal needs.

Hardware Abstraction

By providing a well-defined x86 VM interface to virtual appliance, the VAT shields the virtual appliance it runs from details of the underlying hardware.

Separation of System and User Data

A virtual appliance is mated with user disk when it is used. This means that publishers of virtual appliances can update one system and all users can use the latest copy.

Composition and Inheritance in Appliance Definition

As described above, the CVL allows new appliances to be defined in terms of base appliances so that updates made to the latter automatically propagate to the former. Moreover, each virtual appliance can be composed to create virtual networks of virtual appliances, and specialized appliances can be derived from parent appliances using inheritance.

As one skilled in the art will appreciate, most digital computer systems can be installed with the present invention. To the extent that a particular computer system configuration is programmed to implement the present invention, it becomes a digital computer system within the scope and spirit of the present invention. That is, once a digital computer system is programmed to perform particular functions pursuant to computer-executable instructions from program software that implements the invention described heretofore, it in effect becomes a special purpose computer particular to the present invention. The necessary programming-related techniques are well known to those skilled in the art and thus are not further described herein for the sake of brevity.

Computer programs implementing the invention described herein can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the invention disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention. Accordingly, the scope of the present invention should be determined by the following claims and their legal equivalents.

The invention claimed is:

1. A computer system comprising:
    a virtual appliance repository storing one or more virtual appliances;
    a host computer;
    a network coupling said virtual appliance repository and said host computer; and
    a storage device storing a transceiver program capable when executed on said host computer of performing operations comprising:
        requesting and receiving said virtual appliances, and generating for each received virtual appliance a respective local copy on the host computer of each received virtual appliance, the respective local copy being private to the host computer;

binding said virtual appliances to said host computer;

obtaining user data relevant to said virtual appliances; and running each of said virtual appliances from said respective local copies on said host computer.

2. The computer system of claim 1, wherein the transceiver program is further capable of performing on said host computer operations comprising:

initiating said running of each of said virtual appliances at a time when said respective local copies of said virtual appliances are incomplete copies.

3. The computer system of claim 1, wherein any changes to a running virtual appliance made by the running virtual appliance are made to the respective local copy of the virtual appliance and not to the corresponding virtual appliance stored on the virtual appliance repository.

4. The computer system of claim 1, wherein the transceiver program is further capable of performing on said host computer operations comprising:

communicating user authentication to said virtual appliance repository.

5. The computer system of claim 1, wherein the transceiver program is further capable of performing on said host computer operations comprising:

transmitting altered virtual appliances to said virtual appliance repository.

6. The computer system of claim 1, wherein the transceiver program is further capable of performing on said host computer operations comprising:

backing up altered user data and newly created user data over said network, the computer system further comprising: at least one user data repository coupled to said network.

7. The computer system of claim 6, wherein changes directed to a user disk are separately stored on one or more version virtual disks in said user data repository.

8. The computer system of claim 7, wherein said version virtual disks are discarded at the end of a user log in session such that said user disk is not affected by said changes.

9. The computer system of claim 7, wherein said changes are committed back to said user data repository, thereby becoming a latest version of said user disk.

10. The computer system of claim 1, wherein the transceiver program is further capable of performing on said host computer operations comprising:

interacting with the virtual appliance repository to subscribe to, request, and receive virtual appliances stored on the virtual appliance repository.

11. The computer system of claim 1, wherein at least one of said virtual appliances consists of a network of virtual appliances.

12. The computer system of claim 1, wherein said transceiver program further comprises a virtual machine monitor.

13. The computer system of claim 1, wherein changes made to a user-subscribed virtual appliance are separately stored on one or more version virtual disks.

14. The computer system of claim 12, wherein said changes are discarded at the end of a user log in session such that said user-subscribed virtual appliance is not affected by said changes.

15. The computer system of claim 12, wherein said changes are committed back to said virtual appliance repository, thereby becoming a latest version of said user-subscribed virtual appliance.

16. The computer system of claim 1, further comprising:

a storage means having a cache optimized for holding virtual disks;

a caching subsystem that fetches and caches new data and evicts old data, wherein said new data include metadata for virtual program disks of said virtual appliances; and upon a first use of a virtual appliance or a new release thereof, automatically charges said storage means with a set of predetermined repository blocks.

17. The computer system of claim 1, further comprising:

a storage means having a cache for holding virtual disks;

a caching subsystem that fetches and caches new data and evicts old data, wherein said new data include metadata for virtual program disks of said virtual appliances, wherein said caching subsystem has a log mode in which said cache subsystem continuously backs up user data in order as generated to a user data repository;

a checkpoint mode in which said cache subsystem takes snapshots of said user data at a plurality of checkpoints and writes said snapshots to said user data repository; and a combination mode in which said cache subsystem automatically switches between said log mode and said checkpoint mode.

* * * * *